US012580826B2

(12) United States Patent
Ly et al.

(10) Patent No.: US 12,580,826 B2
(45) Date of Patent: Mar. 17, 2026

(54) 5G SUPPORT FOR AI/ML COMMUNICATIONS

(71) Applicant: InterDigital Patent Holdings, Inc., Wilmington, DE (US)

(72) Inventors: Quang Ly, North Wales, PA (US); Michael Starsinic, Newtown, PA (US); Catalina Mladin, Hatboro, PA (US); Jiwan Ninglekhu, Royersford, PA (US); Kyle Pan, Saint James, NY (US)

(73) Assignee: InterDigital Patent Holdings, Inc., Wilmington, DE (US)

( * ) Notice: Subject to any disclaimer, the term of this patent is extended or adjusted under 35 U.S.C. 154(b) by 0 days.

(21) Appl. No.: 18/708,395

(22) PCT Filed: Nov. 11, 2022

(86) PCT No.: PCT/US2022/079714
§ 371 (c)(1),
(2) Date: May 8, 2024

(87) PCT Pub. No.: WO2023/086937
PCT Pub. Date: May 19, 2023

(65) Prior Publication Data
US 2025/0310214 A1 Oct. 2, 2025

Related U.S. Application Data

(60) Provisional application No. 63/278,772, filed on Nov. 12, 2021.

(51) Int. Cl.
*H04L 41/16* (2022.01)
*H04W 24/10* (2009.01)

(52) U.S. Cl.
CPC ............ *H04L 41/16* (2013.01); *H04W 24/10* (2013.01)

(58) Field of Classification Search
None
See application file for complete search history.

(56) References Cited

U.S. PATENT DOCUMENTS

| | | | | | |
|---|---|---|---|---|---|
| 11,553,075 | B2 * | 1/2023 | Hwang | ............. | H04M 1/72451 |
| 11,811,863 | B2 * | 11/2023 | Shariat | ................ | H04L 67/1034 |
| 12,342,225 | B2 * | 6/2025 | Chong | .................. | H04W 36/34 |
| 2021/0136170 | A1 * | 5/2021 | Katre | ................. | H04L 41/0853 |
| 2022/0248287 | A1 * | 8/2022 | Chong | .................. | H04W 24/02 |

(Continued)

FOREIGN PATENT DOCUMENTS

| | | |
|---|---|---|
| CN | 112512058 A | 3/2021 |

OTHER PUBLICATIONS

3rd Generation Partnership Project, "Technical Specification Group Services and System Aspects; System architecture for the 5G System (5GS); Stage 2 (Release 17)", 3GPP TS 23.501 V17.2.0, Sep. 2021, 542 pages.

(Continued)

*Primary Examiner* — Backhean Tiv
(74) *Attorney, Agent, or Firm* — Flaster Greenberg P.C.

(57) ABSTRACT

Methods, systems, and devices may assist in artificial intelligence (AI) or machine learning (ML) communications in 5G system, AI or ML traffic differentiation, AI or ML slice type, AI or ML triggering rules, AI or ML policy, AI or ML operations, or user equipment communication interface exposure.

20 Claims, 14 Drawing Sheets

(56) References Cited

U.S. PATENT DOCUMENTS

| | | | | |
|---|---|---|---|---|
| 2023/0185933 | A1* | 6/2023 | Chong | G06F 21/62 |
| | | | | 726/27 |
| 2023/0216745 | A1* | 7/2023 | Chen | H04W 24/02 |
| | | | | 370/252 |
| 2023/0412513 | A1* | 12/2023 | Jin | H04L 41/5054 |
| 2024/0296344 | A1* | 9/2024 | Wan | G06N 3/09 |
| 2024/0323828 | A1* | 9/2024 | Ianev | H04W 60/00 |

OTHER PUBLICATIONS

3rd Generation Partnership Project, "Technical Specification Group Services and System Aspects; Procedures for the 5G System (5GS); Stage 2 (Release 17)", 3GPP TS 23.502 V17.2.0, Sep. 2021, 713 pages.

3rd Generation Partnership Project, "Technical Specification Group Services and System Aspects; Architecture enhancements for 5G System (5GS) to support network data analytics services (Release 17)", 3GPP TS 23.288 V17.2.0, Sep. 2021, 196 pages.

3rd Generation Partnership Project, "Technical Specification Group Services and System Aspects; Study on traffic characteristics and performance requirements for AI/ML model transfer in 5GS (Release 18)", 3GPP TR 22.874 V18.1.0, Sep. 2021, 111 pages.

3rd Generation Partnership Project, "Technical Specification Group Services and System Aspects; Service requirements for the 5G system; Stage 1 (Release 18)", 3GPP TS 22.261 V18.4.0, Sep. 2021, 107 pages.

* cited by examiner

5G SUPPORT FOR AI/ML COMMUNICATIONS

CROSS-REFERENCE TO RELATED APPLICATIONS

This application is the 371 National Stage of International Application No. PCT/US2022/079714, filed on Nov. 11, 2022, which claims the benefit of U.S. Provisional Patent Application No. 63/278,772, filed on Nov. 12, 2021, the entire contents of each of which are hereby incorporated by reference herein.

BACKGROUND

FIG. 1 shows the 3GPP 5G non-roaming system architecture where network functions communicate with each other over a service-based interface in the Core Network (CN). A User Equipment (UE) may communicate with the core network to establish control signaling and enable the UE to use services from the CN. Examples of control signaling functions are registration, connection and mobility management, authentication and authorization, session management, etc. After control signaling have been established, the UE can then utilize the user plane functionality to send and receive data to and from a Data Network (DN), e.g., the internet.

The following descriptions highlight some of the capabilities of the Network Functions (NFs) from FIG. 1 that are involved with control signalling.

Access and Mobility Function (AMF): The UE sends an N1 message through the RAN node to the AMF to perform many control plane signaling such as registration, connection management, mobility management, access authentication and authorization, etc.

Session Management Function (SMF): The SMF is responsible for session management involved with establishing PDU sessions to allow UEs to send data to Data Networks (DNs) such as the internet or to an application server and other session management related functions.

Policy and Control Function (PCF): The PCF provides the policy framework that governs network behavior, accesses subscription information to make policy decisions, etc.

Authentication Server Function (AUSF): The AUSF supports authentication of UEs for 3GPP and untrusted non-3GPP accesses.

Unified Data Management/Repository (UDM/UDR): The UDM/UDR supports generation of 3GPP AKA Authentication Credentials, user identification handling, subscription management and storage, etc.

Network Slice Selection Function (NSSF): The NSSF is involved with aspects of network slice management such as selection of network slice instances for UEs, management of NSSAIs, etc.

Network Repository Function (NRF): The NRF supports service discovery function in the 5G network.

Network Exposure Function (NEF): The NEF supports the exposure of capabilities and events in the core network to third parties, Application Functions (AF), Edge Computing, etc.

The RAN node offers communication access from the UE to the core network for both control plane and user plane communications. A UE establishes a PDU session with the CN to send data traffic over the user plane through the (R)AN and UPF nodes of the 5G system (5GS). Uplink traffic is sent by the UE and downlink traffic is received by the UE using the established PDU session. Data traffic flows between the UE and the DN through the intermediary nodes: (R)AN and UPF.

This background information is provided to reveal information believed by the applicant to be of possible relevance. No admission is necessarily intended, nor should be construed, that any of the preceding information constitutes prior art.

SUMMARY

Disclosed herein are methods, systems, and devices that may assist in AI/ML communications in 5GS, AI/ML traffic differentiation, AI/ML slice type, AI/ML triggering rules, AI/ML policy, AI/ML operations, or UE communication interface exposure.

With the availability of split AI/ML models and the additional UE capabilities for AI/ML operations, the 5G system is in position to expand AI/ML communications to connect UEs and application servers for furthering AI/ML advancements. Conventionally, there is little to no support for AI/ML communications in 5G systems but enhancements to the 5G system may enable such communications between UEs and application servers.

Enhancements may be made to network functions such as AMF, SMF, and UPF to be able to differentiate AI/ML traffic from normal user traffic. The enhancements for AI/ML traffic differentiation may be made at the network slice level, at the PDU session level, at the AI/ML session level, or at QoS flow level. A benefit of AI/ML traffic differentiation is the ability of the 5G system to charge accordingly for the traffic.

AI/ML triggering rules may be introduced for the 5G network or AF to inform UEs when to communicate with an application server for AI/ML operations. The triggering rules may include an event component, an action component, and a validity component.

AI/ML policies may be sent from an AF/AS to UEs to provide AI/ML model usage information. The AI/ML policy may include policy information, learning information, model information, performance information, and reporting information.

AI/ML operations are defined as actions a UE performs in support of AI/ML communications. A UE may be required to provide data for AI/ML inference, split AI/ML model training, labeled training data, or analytics verification, among other types of AI/ML traffic. In addition, a UE may also need to download AI/ML models from application servers and provide device capability and performance data to AF/AS for the evaluation of participating in AI/ML communications.

In support of AI/ML communications, UEs and AFs may need to expose a communication interface to AF/AS and NWDAF respectively. The communication interface may support subscription/notification mechanism, request for capability and data, and configuration of AI/ML policy. The subscription and notification mechanism can be used for analytics verification and AI/ML data transfer.

In an example, an apparatus may include one or more processors and memory. The memory may be coupled with the one or more processors and store executable instructions that when executed by the one or more processors cause the one or more processors to effectuate operations comprising sending a request for establishing a protocol data unit (PDU) session, wherein the request may include an indication that the PDU session is for transmitting or receiving artificial intelligence (AI) or machine learning (ML) traffic; in response to the request, receiving a PDU session accept message from a session management function, wherein the PDU session accept message may include information associated with an AI or ML policy; and communicating, based on the information associated with the AI or ML policy, AI or ML traffic over the PDU session, wherein the information associated with the AI or ML policy may indicate a traffic type that is associated with AI or ML.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not constrained to limitations that solve any or all disadvantages noted in any part of this disclosure.

BRIEF DESCRIPTION OF THE DRAWINGS

A more detailed understanding may be had from the following description, given by way of example in conjunction with the accompanying drawings wherein.

DETAILED DESCRIPTION

Figure 1:
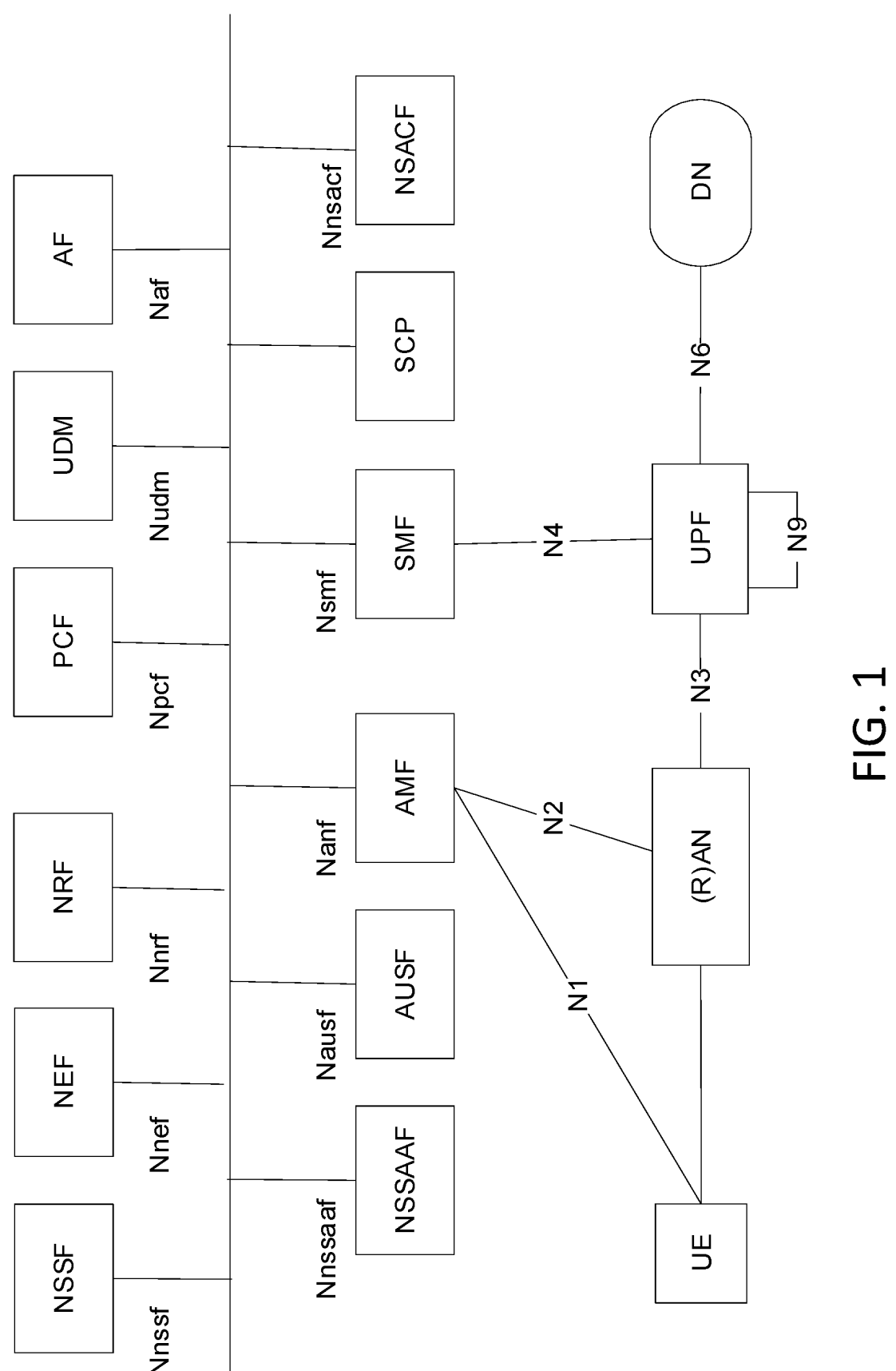
FIG. 1 illustrates a 5G non-roaming system architecture.

The Network Data Analytics Function (NWDAF), which is not shown in FIG. 1, is another network function in the 5G core network that provides data analytics to service consumers in the network. The NWDAF may collect data from other network functions or entities (e.g., operation administration and maintenance (OAM) system) and generates statistic or predictive outputs to aid in network status monitoring and performance improvements. TS 23.288 defines the functionality of NWDAF in more detail.

The NWDAF may subscribe to collect data from NFs, such as AMF, SMF, PCF, etc.; collect data from OAM entities; or collect data from Application Functions (AFs). After receiving the data, the NWDAF may process the data, generate statistic, or predictive outputs, and send the output to the NF or OAM entity that requested the analytics.

Other network functions or OAM entities request analytics from the NWDAF using the Analytics IDs defined in TS 23.288. The Analytics IDs may define the type of output that is generated, the target entities the analytics is performed on, the data that is required for the analytics, the source from where the data is received, the target period of the analytics, or other parameters as defined in TS 23.288. In addition to Analytics IDs depicting network conditions, there are also Analytics IDs that provides UE related analytics. Some Analytics IDs that depict network and UE performance information are listed below, such as load level information, service experience, NF load information, network performance, UE mobility, UE communication, abnormal behaviour, user data congestion, or quality of service (QoS) sustainability.

Load level information: The NWDAF provides slice load level information to an NF on a network slice instance level.

Service Experience: This clause may specify how NWDAF may provide observed service experience (e.g., average observed service MoS) analytics, in the form of statistics or predictions, to a service consumer. The observed service experience analytics may provide one or both of the following: service experience for a network slice or service experience for an application.

NF load information: TS 23.288 describes how NWDAF may provide NF load analytics, in the form of statistics or predictions or both, to another NF.

Network Performance: With network performance analytics, NWDAF provides either statistics or predictions on the load, communication, and mobility performance in an area of interest; in addition, NWDAF it may provide statistics or predictions on the number of UEs that are located in that area of interest.

UE mobility: NWDAF supporting UE mobility statistics or predictions shall be able to collect UE mobility related information from NF, OAM, or to perform data analytics to provide UE mobility statistics or predictions.

UE communication: In order to support some optimized operations, e.g., customized mobility management, traffic routing handling, or QoS improvement, in 5GS, an NWDAF may perform data analytics on UE communication pattern and user plane traffic, and provide the analytics results (e.g., UE communication statistics or prediction) to NFs in the 5GC.

Abnormal behaviour: This clause may define how to identify a group of UEs or a specific UE with abnormal behaviour, e.g., being misused or hijacked, with the help of NWDAF.

User Data Congestion: User data congestion related analytics may relate to congestion experienced while transferring user data over the control plane or user plane or both. A request for user data congestion analytics may relate to a specific area or to a specific user.

QoS Sustainability: The consumer of QoS sustainability analytics may request the NWDAF analytics information regarding the QoS change statistics for an analytics target period in the past in a certain area or the likelihood of a QoS change for an analytics target period in the future in a certain area.

In addition to providing analytics information, the NWDAF may be enhanced to provide ML model provisioning in support of generating the analytics. The NWDAF architecture may be enhanced to include analytics logical functions (AnLF) or model training logical functions (MTLF). The AnLF may perform inference, derive analytics information, or expose analytics service. The MTLF may be responsible for training ML models or exposing new training services. The AnLF and MTLF may be logical functions internal to the NWDAF. Communications between AnLF and MTLF may be limited to intra and inter NWDAF instances. The exposed interfaces of the NWDAF to other network functions are listed in Table 7.1-1 of TS 23.288.

Artificial Intelligence (AI) or Machine Learning (ML) applications are becoming more prevalent in a range of industry domains such as factory robots, autonomous vehicles, image production, video production, or the like. The popularity and increase capabilities of mobile devices (e.g., smartphones, automotive, robots, etc.) have enabled the expansion of AI/ML applications to end devices (e.g., UEs).

AI/ML learning may be generally classified as at least one of the following types: supervised learning, unsupervised learning, or reinforcement learning. In supervised learning, a model may be trained using labeled data in which a set of inputs and expected outputs are provided to the model to "train" the model for inference. After training, the model may then predict whether new data may be classified as one of the labels (e.g., image recognition) or what a numerical value could be (e.g., housing price). In unsupervised learning, a model may be provided with only input data (e.g., unlabeled data) and the model outputs relationships extracted from the data. For these cases, the outputs may be grouped together into clusters to learn of patterns in the data, e.g., recommendation systems alerting users what products were purchased based on search criteria. For reinforcement learning, the model may act as an agent operating and navigating an environment based on feedback received. An example may be an agent learning how to play a game and receiving feedback whether it won or lost the game. The agent then learns using the feedback received over many game iterations.

Traditionally, AI/ML model training or inference may be performed predominantly in cloud servers or datacenters due to the enormous computationally intensive requirements of the models or the large datasets required to train the models. Data collection for the large datasets may be cumbersome and time-consuming, requiring data scientists to extract information from various sources and processing the data into the required format for input into the models. The models may include millions of parameter updates per iteration of training data and thus may require robust processing capabilities.

Advancements in the processing capabilities of smartphones (e.g., mobile devices) and the splitting of AI/ML models have enabled AI/ML operations to be supported by end devices. Being mobile, the end devices are able to collect a variety of data using the available sensors on the device. For example, cameras or other sensors on smartphones may provide images, videos, positioning information, or other data that may be used for training AI/ML models or used as inputs for inference. In addition, mobile processors may include built-in neural processing engines to support running distributed AI/ML models for training or inference.

3GPP has studied the traffic characteristics and performance requirements for supporting device-based AI/ML applications in 5G systems. The study focused on aspects of AI/ML operations including the splitting of model functionality between endpoints, AI/ML model and data distribution and sharing, and distributed or federated learning over the 5G system. Various use cases were considered and documented in 3GPP TR 22.874. These use cases include split control for robotics, real time media editing based on AI/ML model distribution, or federated learning for image processing or video processing.

An important aspect of the study focuses on the splitting and distribution of AI/ML model/functionality into multiple parts depending on the task and environment. This split distributes the AI/ML operation between mobile devices and network endpoints, such as cloud servers or datacenters. The end device may collect inputs and apply the data to a partial AI/ML model to generate intermediate results that are uploaded to the network endpoints for further processing. Alternatively, the collected data may be used for inference by a model on the network endpoint. The inference output or updated model provided by the network endpoint is then returned to the end device to complete an iteration of the AI/ML operation.

In addition to AI/ML inference, model splitting can also be applied to AI/ML training using Federated Learning. In Federated Learning, a cloud server trains a global model by aggregating local models partially trained by end devices in an iterative fashion. Each training iteration consists of device selection, model distribution and training configuration, and the reporting of training results. The cloud server aggregates the training results and updates the global model, which may trigger an update of local models to perform the next training iteration. The transfer of the AI/ML models and training data between the end devices and the cloud server would be transported using the ubiquitous coverage of the 5G system.

The 5G system is able to support different use cases and scenarios for AI/ML applications and operations. 3GPP TS 22.261 captures key performance indicators (KPIs) for various use cases such as split AI/ML image recognition, split control for robotics, uncompressed federated learning, or AI/ML model distribution. Different performance requirements or KPIs may be needed for different AI/ML use cases. For example, the KPIs or performance requirements for the split AI/ML image recognition use case requires a maximum allowed uplink end-to-end latency of 2 ms while the enhanced media recognition use case requires a maximum allowed uplink end-to-end latency of 100 ms and for federated learning use cases, the performance requirements for maximum allowed uplink end-to-end latency is 1s. The maximum allowed downlink end-to-end latency may be between is and 3s for AI/ML model downloading and 12 ms and 100 ms respectively for the split control for robotics and enhanced media recognition use cases. Similarly, the downlink experienced data rates range from 22 Mbit/s for automotive networked systems use case to up to 1.1 Gbit/s for AI/ML model distribution for image recognition use case. The uplink experienced data rates range from 1.5 Mbit/s for enhanced media recognition use case to 1.08 Gbit/s for split AI/ML image recognition use case.

Use Case

In an exemplary scenario, a service provider may want to analyze the performance of an AR/VR application at a gaming convention and may deploy federated learning (FL) models to provide the analysis. The FL models may include a global model and local models. Global model running on an edge server provides the overall analysis. Multiple distributed FL local models are available on the edge servers for download to UEs and other mobile devices, such as AR/VR glasses, gloves, body sensors, or handheld controllers, among other things. Once the models are downloaded to the UEs or mobile devices, data are collected from the available sensors on the devices and possibly from user feedback as well.

The collected data may be processed prior to being applied as inputs to the local models and the local FL models then generates intermediate training results for upload to the global FL model on the edge servers. The training results provided from the multitude of devices may be aggregated together and applied to the global model. After the current FL iteration completes in the global model, new local models may be added to the repository on the edge server or existing local models may be updated for use in future training iterations. The new or updated local models may be downloaded to the UEs (e.g., mobile devices) and the entire process may repeat for the next training iteration.

Issues

Smartphone processors are becoming more powerful with each generation, with the newest generation processors having built-in neural processing cores to assist with AI/ML operations. In addition, multiple sensors on smartphones may provide the ability to collect data that may be used for AI/ML training or inference. The availability of a multitude of IoT devices or wearables present additional opportunities to collect data that may be used in conjunction with the data collected from smartphones for inference or for AI/ML model training purposes. As a result, AI/ML applications are increasingly becoming mainstream and accessible on many mobile devices. Applications, such as image recognition or video enhancement, may be made readily available on UEs (e.g., smartphones or other connected devices).

The 5G system currently treats AI/ML model and data the same as other types of data such as internet data. As can be seen with the KPIs documented in 3GPP TS 22.261, the performance requirements for AI/ML support are quite stringent. The 5G network does not have a mechanism to differentiate AI/ML traffic from non-AI/ML traffic. AI/ML models may be very large and some may require high data rates or low latency for their application. Not having the ability to identify AI/ML traffic or monitor the performance characteristics of the traffic in the 5G networks may impact AI/ML operations between end devices (e.g., UEs) and cloud servers.

In addition, there is a lack of exposure of traffic performance and network conditions for third party AI/ML applications to make decisions on AI/ML operations. Federated learning models may require some level of coordination between local models running on end devices and a global model running on cloud servers (e.g., datacenter devices) to aggregate and iterate the training. Without having visibility on traffic performance or network conditions, AI/ML decisions, e.g., selecting devices for federated learning or synchronizing devices for flock use case as described in 3GPP TR 22.874, cannot be made optimally to select the best devices for performing the required tasks and within the required time.

With the availability of split AI/ML models and the additional UE capabilities for AI/ML operations, the 5G system may be in position to extend AI/ML communications to connect UEs or application servers for furthering AI/ML advancements. Conventionally, there is no support for AI/ML communications in 5G systems but enhancements to the 5G system may enable such communications between UEs and application servers. The following enhancements are disclosed.

Enhancements may be made to network functions such as AMF, SMF, or UPF to be able to differentiate AI/ML traffic from normal user traffic. The enhancements for AI/ML traffic differentiation may be made at the network slice level, at the PDU session level, at the AI/ML session level, or at QoS flow level. A benefit of AI/ML traffic differentiation may be an ability for the 5G system to charge accordingly for the traffic.

An enhancement may be associated with AI/ML triggering rules that may be introduced for the 5G network or AF to inform UEs when to communicate with an application server for AI/ML operations. The triggering rules may include an event component, an action component, or a validity component.

An enhancement may be associated with AI/ML policies that may be sent from an AF/AS to UEs to provide AI/ML model usage information. The AI/ML policy may include policy information, learning information, model information, performance information, or reporting information.

An enhancement may be associated with AI/ML operations that may be defined as actions a UE performs in support of AI/ML communications. A UE may be required to provide data for AI/ML inference, split AI/ML model training, labeled training data, or analytics verification. In addition, a UE may also need to download AI/ML models from application servers or provide device capability or device performance data to AF/AS for the evaluation of participating in AI/ML communications.

An enhancement may be associated with, the support of AI/ML communications, UEs and AFs that may need to expose a communication interface to AF/AS and NWDAF respectively. The communication interface may support subscription/notification mechanism, request for capability and data, or configuration of AI/ML policy. The subscription mechanism or notification mechanism may be used for analytics verification or AI/ML data transfer.

AI/ML communications may entail various aspects of AI/ML operations. For example, UEs may download split AI/ML models from a repository of an application server, collect data for application to model training, or upload the intermediate training results to a global model in the AS for aggregation. UEs may collect data and upload to an AS for inference, or UEs may collect data and generate corresponding labels for use in training supervised models. UEs may even download AI/ML models used to generate measurement metrics that the UEs may use for labeled data or as measurements to indicate experienced network conditions or performance metrics which may then be exposed to the AS or AF to assist with AI/ML operations. The data the UE collects may also be processed, such as using statistical or custom functions, before being used in AI/ML operations. All these scenarios are examples of aspects of AI/ML operations.

Note that the terms "AF" and "AS" are used interchangeably. They refer respectively to an application function or application server managed by a network operator or an authorized third-party service provider for AI/ML applications. The AF/AS may update subscription data for requesting AI/ML support for a UE, configure UEs with AI/ML policy, provide a repository of stored AI/ML models for download, interact with UEs for federated learning applications, or receive from UEs split AI/ML model training results, data for inference, or labeled training data. When the AF/AS is located within the 5G Core network, the AF/AS may communicate to other network functions without the assistance of the NEF. Alternatively, the AF/AS may communicate to other network functions through the NEF.

Figure 2:
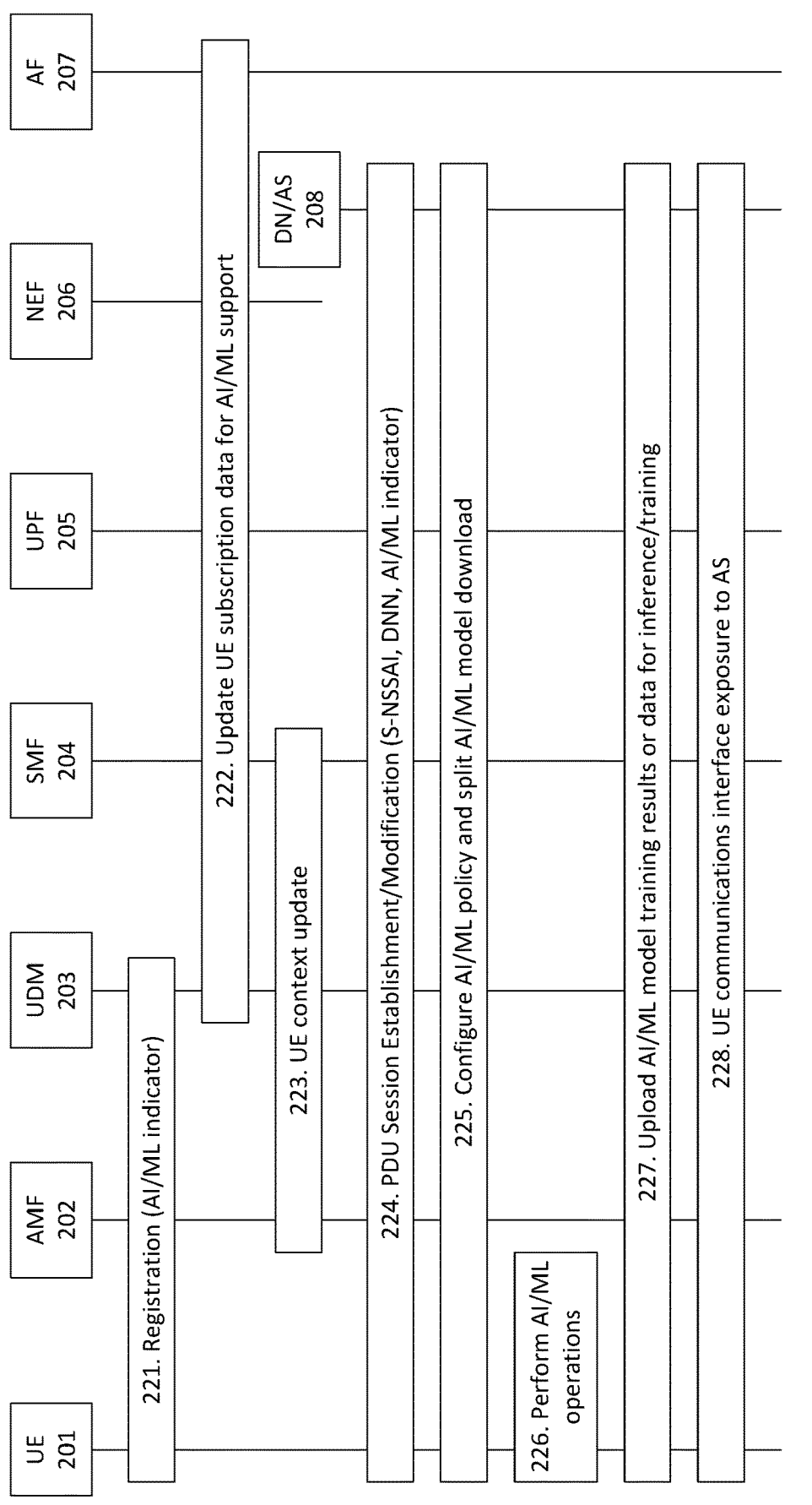
FIG. 2 illustrates a support of AI/ML communications in 5GS.

Enhancements to the 5G or other system to support AI/ML communications may require updates to network functions such as the SMF and the UPF. In addition, AI/ML service configuration may also need support from the UDM/ UDR and NEF to enable an AF to provide configuration information for such support. The NWDAF and UEs may also be involved to provide performance data for an AF to assess whether network conditions and UE capabilities and performance metrics allow for AI/ML operations. FIG. 2 shows an example high level flow showing how an AF may provide AI/ML configuration information to the UDM/UDR to enable a UE to use AI/ML communication services from the 5G system. The example shows the establishment of a PDU session for supporting AI/ML communications and the overall flow of AI/ML operations between a UE and an AF 207/AS 208 in the 5G system.

At step 221, UE 201 may register with the network. As part of the registration request, UE 201 may request support for AI/ML operation to be enabled for UE 201. If the network has a network slice available that the network operator prefers to be used for AI/ML, the network may return to UE 201 in a registration accept message an S-NSSAI and indicate that it is to be used for AI/ML operations, such as sending or receiving AI/ML model information. Alternatively, the network may return to UE 201 a DNN and indicate that it is to be used for AI/ML operations. Alternatively, the network may return to UE 201 an IP Address or FQDN of application server 208 and indicate that it is to be used for AI/ML operations. The slice that is associated with the S-NSSAI may be deployed by the network operator to enable AI/ML model and data transport between UEs 201 and ASs 208. Within the network slice, network analytics and other monitoring information may be exposed to UE 201 and authorized third party service providers to enable efficient AI/ML operations. An application server (AS) 208 may be hosted or reached as indicated by the DNN, IP address, or FQDN. AS 208 may be a repository where AI/ML models are available for download and managed by an authorized third-party service provider or network operator.

The S-NSSAI, DNN, or IP Address or FQDN of the Application Server 208 may be included in a URSP rule that may be sent to UE 201. The IP Address and FQDN may be part of the URSP Rule's traffic descriptor, thus causing UE 201 to direct traffic to the IP Address or FQDN towards the S-NSSAI and DNN Combination. Alternatively, the traffic descriptor of the URSP rule may be an AI/ML indication. Thus, indicating to UE 201 that traffic that is classified as AI/ML may be directed towards the S-NSSAI and DNN combination in one of the RSDs of the URSP Rule.

In another alternative, a URSP Rule may inform UE 201, via a traffic descriptor or an AI/ML indication, which traffic may trigger a PDU establishment with AI/ML operation request. In other words, in this alternative UE 201 may be informed which traffic requires AI/ML operations through the URSP rule.

Alternatively, the IP Address or FQDN of an application server 208 may not be provided to UE 201 until UE 201 established a PDU with the S-NSSAI and DNN combination. The network may provide the IP Address or FQDN of the application server 208 in the PDU session establishment response message and the IP Address or FQDN may be provided in the Protocol Configuration Options (PCO) Information Element. Similarly, UE 201 request for support of AI/ML communications may be provided in the PDU establishment request.

Providing UE 201 with an S-NSSAI or DNN that is to be used for AI/ML communications may allow the network to discriminate between the UE's AIIML traffic and other traffic. Traffic discrimination may be important for treatment purposes (e.g., the AI/ML traffic may require priority handling) and charging purposes (e.g., the AI/ML traffic may need to be charged differently). For example, a service provider may be charged whenever UEs are utilized in split AI/ML model training instead of the UE. Similarly, a UE may be charged for AI/ML inference service performed for UE 201 by the network.

At step 222, an AF 207 (e.g., AF managed by an authorized third-party service provider for AIIML applications) may update the UE's subscription information in the UDM/UDR to enable AI/ML communications for UE 201. This update request message may be sent to the UDM/UDR via NEF 206. Step 222 may be performed prior to UE registration as part of subscription data provisioning. AF 207 may also be operator managed or hosted and may communicate directly with UDM/UDR 203 without the assistance of NEF 206.

At step 223, when UE 201 subscription data includes the authorization for AI/ML communications, UDM 203 may notify UE context holders in the network to enable AI/ML communications for UE 201. AMF 202 or SMF 204 may receive a notification of an update to UE subscription data to update the corresponding UE context to allow AI/ML communications for UE 201.

At step 224, an AI/ML application may launch on UE 201 and the application traffic may trigger the establishment of a PDU session that may be used for AI/ML communications. The application traffic may be directed towards the FQDN or IP Address that was received in step 221. The PDU session request may include an S-NSSAI and DNN received previously from the network during the registration step (e.g., step 221) that may allow for AI/ML communications. The S-NSSAI may identify a network slice that the network has deployed to support AI/ML model and data transport. The DNN may identify a data network that may be used to reach an application server that may send and receive AI/ML model information to or from UE 201. Alternatively, an AI/ML indicator may be included in the PDU session establishment request to signify UE 201 is requesting AI/ML services for the PDU session. When the AI/ML indicator may be included in the PDU session establishment request, it may not be necessary for UE 201 to include a DNN and S-NSSAI in the PDU session establishment request. The network (e.g., AMF 202) may assign an S-NSSAI and DNN to the request. SMF 204 may contact UDM 203 to check whether AI/ML communication is enabled for UE 201 or SMF 204 may have already received a notification from UDM 203 that AI/ML communications are allowed for UE 201. SMF 204 may return an indication that the PDU session is accepted, and that UE 201 may utilize AI/ML services within the PDU session. Information about the IP address or FQDN of an application server, UE 201 may communicate with to download AI/ML models or to perform other AI/ML operations may also be returned to UE 201 at this time. SMF 204 may also provide AI/ML triggering rules to UE 201 in the accept message. The triggering rules configure events that triggers UE 201 to provide information to an application server for evaluation of AI/ML operations. Note this step 224 (as with other steps) may be performed out of the order presented, such as prior to step 222.

At step 225, when the PDU session has been established, UE 201 may expose information about its capabilities and performance metrics to the AS for evaluation of UE 201 participating in AI/ML operations. Alternatively, AS 208 may query UE 201 for such information. If AS 208 determines UE 201 is capable of AI/ML operations, AS 208 may configure an AI/ML policy on UE 201 and UE 201 may then download AI/ML models from a repository in the application server 208 managed by the authorized service provider or network operator using the information provided to UE 201 in the PDU Session accept message (e.g. an IP Address or FQDN) or based on pre-provisioned information from the AI/ML application running on UE 201. Application server 208 may be located in the data network identified by the DNN. The AI/ML policy provides usage information to UE 201 about the downloaded model. The usage information may inform UE 201 of the application of the AI/ML model, the purpose of the AI/ML operation, the data collection requirements, the identification of UE performance metrics to report, the reporting frequency, the reporting interval, etc.

At step 226, UE 201 may perform AI/ML operations as specified by the AI/ML policy, which may include what data to collect, how the collected data is to be processed, how often to collect data, what AI/ML operational mode to apply to the model, how often to report results to AS 208, performance measurements UE 201 may obtain and report to AS 208, or other requirements for using the model.

At step 227, at the reporting interval and based on the operational mode, UE 201 may upload the data or training results generated from running the AI/ML model to AS 208. If the AI/ML operation is for training a global federating learning model, UE 201 may download an updated model with corresponding AI/ML policy for the next training iteration. If the operational mode is one of inference, UE 201 may receive an inference result from the AS after uploading the data. If the operational mode is to provide labeled data for training, UE 201 may send raw data or processed data with the accompanied labels to AS 208 for training. UE 201 may also provide data for analytics verification of NWDAF generated predictions. These operations use the PDU Session that was established earlier. As described earlier, the network may be aware that the PDU Session is used for AI/ML related interactions and the network may treat and charge the traffic accordingly.

At step 228, at any time during AI/ML operations, UE 201 may obtain and report any required measurements to AS 208. UE 201 may have downloaded an AI/ML model that generates the required measurements or UE 201 may send measurements that are generated without the help of the model, such as signal strength, data rate, number of message retransmissions, location information, battery level or battery/power status, etc.

AI/ML traffic differentiation may be accomplished in several ways. First, the 5G system may be deployed such that particular network slices support AI/ML communications and UEs request for using such network slices during registration with the network. PDU sessions created within the network slice may be available for AI/ML communications. Second, AI/ML communications support may be designated at the PDU session level and UEs 201 that may request or prefer to utilize AI/ML communications request for certain PDU sessions that support AI/ML communications. Third, AI/ML transfer session may be requested by AF 207/AS 208 or UE 201 and provided by 5GS via a communication scheduling policy returned to UE 201 and AF 207/AS 208. AI/ML traffic differentiation may also be specified at QoS flow level during PDU session or transfer session requests. Note that these methods are not mutually exclusive.

For supporting AI/ML communications within network slices, a new SST value may be defined to specifically support AI/ML communications as shown in Table 1. The new SST value can be used by UEs 201 to request a network slice from the network that can provide AI/ML communications for UE 201. The presence of the SST value within an S-NSSAI may indicate to the network that UE 201 would like to be authorized for AI/ML communications.

TABLE 1

| Example of new SST value for AI/ML communications | | |
| --- | --- | --- |
| Slice/Service type | SST value | Characteristics |
| eMBB | 1 | Slice suitable for the handling of 5G enhanced Mobile Broadband. |
| URLLC | 2 | Slice suitable for the handling of ultra-reliable low latency communications. |
| MIoT | 3 | Slice suitable for the handling of massive IoT. |
| V2X | 4 | Slice suitable for the handling of V2X services. |
| HMTC | 5 | Slice suitable for the handling of High-Performance Machine-Type Communications. |
| AI/ML | 6 | Slice suitable for the handling of AI/ML communications |

Figure 3:
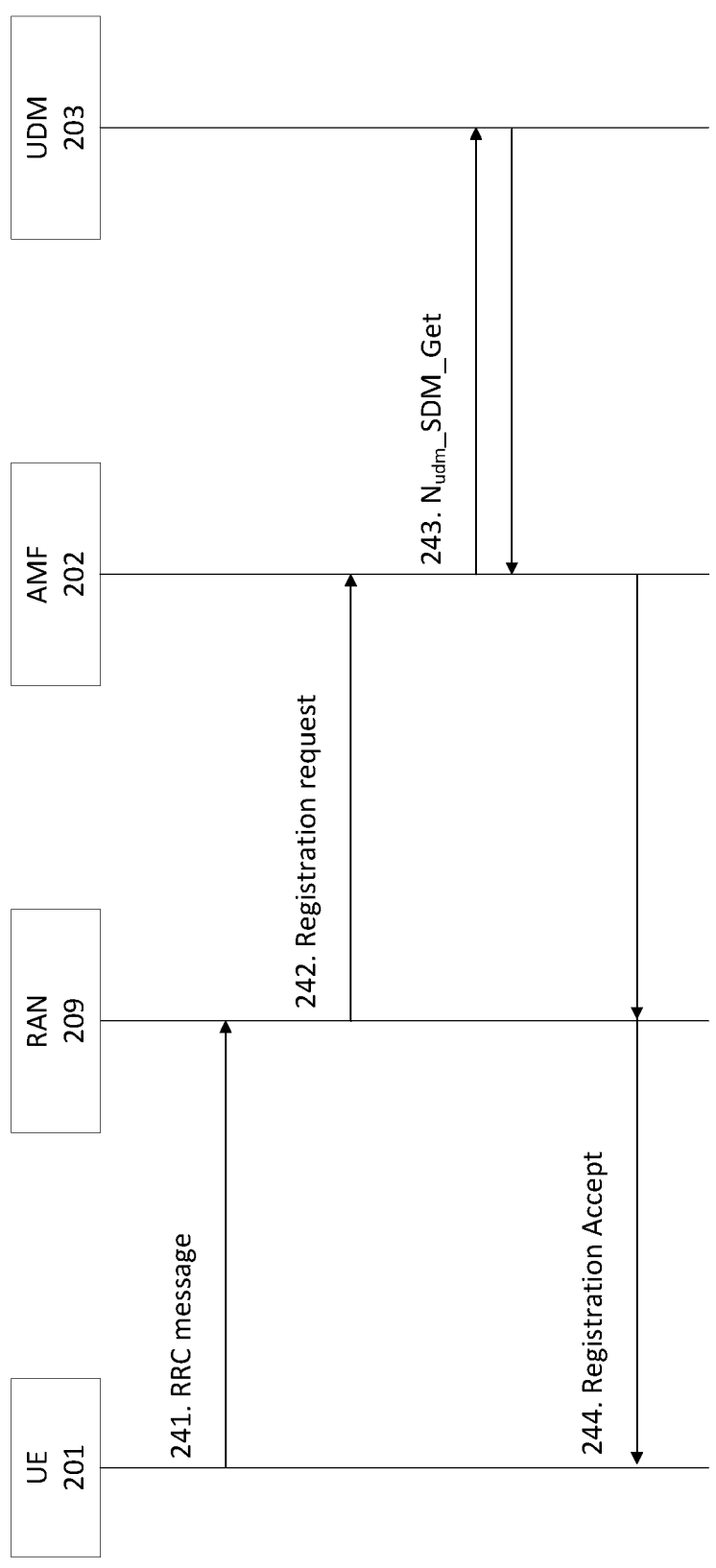
FIG. 3 illustrates a registration for AI/ML communications using network slices.

UE 201 may during registration request indicate the desire to be authorized for AI/ML communications through the use of network slices by providing a Requested NSSAI information element in the request. Within the Requested NSSAI, UE 201 may include one or more S-NSSAIs whose SST value corresponds to a slice or service type that is suitable for the handling of AI/ML communications. In the example as shown in Table 1, the S-NSSAIs may have an SST value of 6. FIG. 3 shows an example registration procedure where UE 201 requests for AI/ML communication support using network slices.

At step 241, UE 201 may send an RRC message to RAN node 209 and within the RRC message may be a NAS registration request message to register UE 201 with the network. The registration request message may include a Requested NSSAI information element in which one or more S-NSSAIs includes an SST value that corresponds to a slice that supports the handling of AI/ML traffic. The request may also include information about requested AI/ML communication requirements such as data rate, latency, requirements for Edge Data Network support, etc.

At step 242, RAN node 209 may perform AMF selection and forwards the registration request to the selected AMF 202. RAN node 209 may use information in the Requested NSSAI, specifically the SST value, to select AMF 202 that is able to process requests for support of AI/ML communications for cases in which support for AI/ML communications is not universal within the network.

At step 243, as part of the registration request processing as described in section 4.2.2.2.1 of 3GPP TS 23.502, AMF 202 may perform an Nudm_SDM_Get service operation to obtain subscription information for UE 201 from the UDM. The subscription information is used to evaluate or determine whether UE 201 is authorized for the network slices being requested to support AI/ML communications. Note that the figure does not show the entire registration procedure in this step 243 but only the interaction of AMF 202 with UDM 203 for obtaining subscription information of UE 201.

At step 244, if UE 201 is authorized for the S-NSSAIs in the Requested NSSAI information element, AMF 202 returns the S-NSSAIs in the Allowed NSSAI information element of the registration accept message to UE 201. UE 201 is then able to use network slices identified by the S-NSSAIs for AI/ML communications. The presence of the one or more S-NSSAIs in the Allowed NSSAI that include an SST value that corresponds to a slice that supports the handling of AI/ML traffic may be an indication to UE 201 that UE 201 may generate AI/ML traffic.

Another approach to support AI/ML communications within the 5G network is through the use of PDU sessions.

Figure 4:
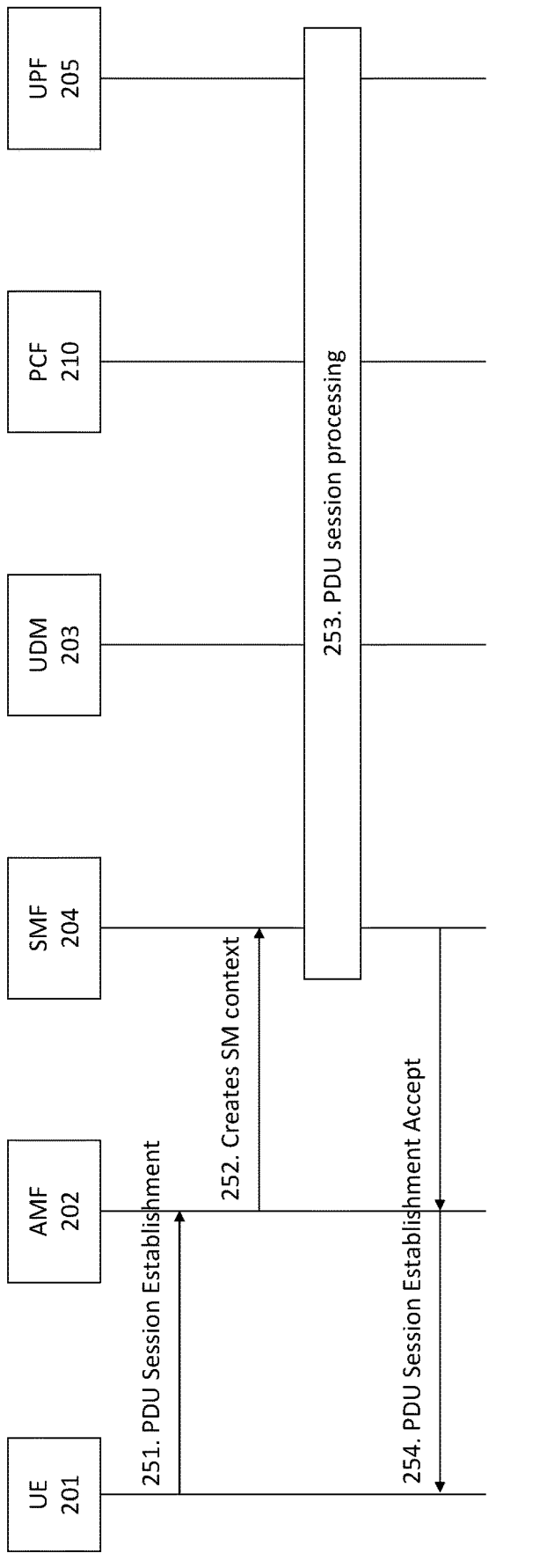
FIG. 4 illustrates a PDU session establishment for AI/ML communications.

UE 201 may n request to establish a PDU session that supports AI/ML communications by providing an indication for enabling AI/ML communications in a PDU session establishment request. FIG. 4 shows an example procedure where UE 201 requests a PDU Session for use in AI/ML communications.

At step 241, UE 201 sends a PDU session establishment request to AMF 202. In the request, UE 201 may include a S-NSSAI and a DNN for the PDU session. The S-NSSAI may have been an S-NSSAI that was previously returned to UE 201 in the Allowed NSSAI information element for AI/ML communications. The S-NSSAI may have an SST value that corresponds to a slice type or service type that supports AI/ML communications. The DNN may be the name of a data network where AS 208 or AF 207 is hosted for AI/ML communications for which UE 201 may perform AI/ML operations. The data network may be within a trusted domain or an untrusted domain of the network. Alternatively, UE 201 may include a separate indicator that indicates UE 201 would like to enable AI/ML communications for this PDU session. For example, the indicator may be enumerated within the 5GSM capability information element of the PDU session establishment request message. The request may also include information about requested AI/ML communication requirements such as data rate, latency, requirements for Edge Data Network support, a reference to subscription data providing such information, etc. The reference to subscription data may be provided by AF 207 to UE 201 after AF 207 has negotiated with the 5G network for AI/ML transfer session, which is described hereinafter.

At step 242, AMF 202 performs SMF selection and sends the selected SMF 204 a request to create Session Management context for UE 201. If the AI/ML communications indicator was encoded in the 5GSM capability information element, AMF 202 may use the information to properly select SMF 204 that supports creating PDU sessions for AI/ML communications. AMF 202 may also obtain this information from the S-NSSAI value if the SST component value indicates the slice type is for AI/ML communications.

At step 243, SMF 204 performs the PDU session establishment procedure as outlined in section 4.3.2.2 of 3GPP TS 23.502. As part of this procedure, SMF204 interacts with UDM 203 to obtain subscription information, with the PCF to obtain policy information, and with UPF 205 to provide user plane session information. SMF 204 may provide the AI/ML communications indicator to the UDM 203, PCF 210, or UPF 205 to indicate UE's desire for AI/ML communications. Depending on the subscription information for UE 201 in the UDM 203, appropriate AI/ML triggering rules may be generated for the PDU session that are sent to UE 201 and the UPF 205. The triggering rule may be provided to SMF 204 by PCF 210. Note that instead of UE 201 providing the AI/ML indication, the AI/ML indication may be stored as subscription information in UDM 203. In that case, SMF 204 is informed from the subscription information that the PDU session is for AI/ML communications. SMF 204 may then provide an AI/ML indication to PCF 210 and UPF 205 to indicate the PDU session is for AI/ML communications. Alternatively, SMF 204 may return to UE 201 one or more signaled QoS rules or QoS flow descriptions to use for AI/ML communications. The signaled QoS rules may include QFIs that UE 201 may include in message headers of uplink traffic to identify QoS flows for AI/ML communications. Similarly, the QoS flow descriptions may include a QFI and also Guarantee Bit-Rate (GBR) QoS flow parameters such as uplink Guaranteed flow bit rate (GFBR) and uplink Maximum flow bit rate (MFBR) if the AI/ML traffic is to be carried with GBR QoS flows. The GBR parameters may be specified to support the KPI requirements of AI/ML traffic. If UE 201 supports Reflective QoS (RQoS) and included the RQoS bit in the 5GSM capability information element during PDU session request, SMF 204 may include the RQoS timer information element in the accept message to indicate Reflective QoS may be used for this PDU session. Downlink AI/ML traffic may then be tagged with a QoS flow identifier (QFI) that have been identified for carrying AI/ML traffic and UE 201 may then derive QoS rules based on the received downlink AI/ML traffic and use the QFI from the downlink traffic for the uplink AI/ML traffic. The QFI may represent QoS flows that the 5G network has identified for AI/ML communications.

At step 244, SMF 204 returns a PDU session establishment accept message to UE 201 if the PDU session is able to support AI/ML traffic. The Accept message may include the S-NSSAI whose SST value represents the capability to support the handling of AI/ML traffic. Alternatively, the accept message may include a new indication, e.g.. AI/ML communications indication, that indicates the PDU session is able to be used for AI/ML communications. SMF 204 may also include QoS rules with QFIs that UE 201 uses to attach to uplink traffic for identification of AI/ML communications. Included in the response may be AI/ML triggering rules that UE 201 uses to initiate AI/ML communications. These rules may be used by UE 201 to determine when to initiate communications between UE 201 and AF 207 for AI/ML communications. In addition, UE 201 may also receive information on performance measurements that UE 201 needs to expose to the network or AS 208/AF 207 for AI/ML operations. An AI/ML policy may be provided to UE 201 as well; the AI/ML policy may have been provisioned by AF 207 through the UDM 203, PCF 210, SMF 204, or other NF for use after the PDU session has been established.

The AI/ML triggering rules may be utilized by AF 207 to configure UE 201 so that UE 201 will know when AF 207 requests or prefers UE 201 to initiate communications between UE 201 and AS 208. Prior to UE 201 requesting to establish a PDU session for AI/ML communications, AF 207 may provision information to the UDM in the subscription data associate with UE 201 about the conditions that can trigger AI/ML communications between UE 201 and AS 208. The conditions may include but not limit to the following: UE 201 is entering an area where AI/ML operations are being requested, during certain times when AI/ML training is being performed, a combination of both UE 201 entering an area and during the certain times when AI/ML operations are active, when a user launches certain types of applications, or when UE 201 has established multiple connectivity or registration, e.g., when UE 201 has multiple connections (e.g., an NR and a non-3GPP connection) through which AI/ML operations may utilize.

The triggering rules may have an event component, an action component, and a validity component. The event component informs UE 201 the conditions upon which to perform the action specified and the validity component determines when the triggering rule is active or under which conditions the rules may be evaluated. Examples of events are UE 201 entering or is in a certain area, an AI/ML application launching on UE 201, UE 201 establishes a PDU session for AI/ML communications, UE 201 transitions out of IDLE state, etc. Examples of actions UE 201 may take upon the detection of a triggering event are to establish or modify a PDU session, perform a Service Request for enabling user plane resources of a PDU session capable of AI/ML communications, send to an AF 207/AS 208 device or performance information, download an AI/ML model, etc. Examples of validity conditions may be time of day, the number of active AI/ML models are below the maximum allowed, UE 201 battery is at least a minimum level, the processor utilization or memory utilization of UE 201 for AI/ML operations are within the maximum as specified by the user, UE's roaming status in association with user configuration of allowing AI/ML operations during roaming, etc.

Example triggering rules may be as follows. In an example, UE 201 enters a particular tracking or registration area is the triggering event that may cause UE 201 to perform the action of establishing a PDU session for AI/ML communications provided UE's battery level is above a certain percentage. In an example, an AI/ML application launches on UE 201 is the triggering event that causes UE 201 to perform a Service Request to re-establish user plane resources for an already established PDU session capable of AI/ML communications provided the number of AI/ML models is not exceeded. In an example, UE 201 establishes a PDU session for AI/ML communications is the triggering event that causes UE 201 to send UE's device capabilities for AI/ML operations to an application server provided UE 201 is not roaming.

Note that the example AI/ML triggering rules may only include a single event, action, or validity condition for simplicity of understanding. The rules may additionally be constructed with compound events, actions, or validity conditions as appropriate. As an example, an AI/ML triggering rule may have as an event a UE 201 entering a particular area and an AI/ML application is launched. The triggered action may require UE 201 to establish a PDU session for AI/ML communications and to send an AF 207 UE 201's device information and the validity conditions may be that UE 201 has at least 40% battery level with no more than 3 AI/ML applications running. In addition, multiple AI/ML triggering rules may be sent to or pre-configured in UE 201 to define multiple, individual events that may trigger UE communications with AF 207/AS 208 for AI/ML operations.

When the conditions for a triggering rule is met, UE 201 may need to call an API or AT command to notify an AI/ML application to communicate to an application server. The application may be an AI/ML Enabler Client on UE 201 that is configured to communicate to an AI/ML application server or the application may be a user application that requires AI/ML communications.

AI/ML transfer sessions may be enabled by negotiations between the AF 207/AS 208 or UE 201 and 5GC so that a future AI/ML communication scheduling policy is provided to support such AI/ML transfer sessions. This method may rely upon AI/ML algorithms' ability to predict required communications and allows 5GC to manage its resources such that the AI/ML communication requirements are fully supported during that time.

Requests from UEs for AI/ML transfer sessions may include information for required or desired parameters for the AI/ML transfer sessions such as: time window, data rate, latency, QoS, etc., charging information, Edge Data Network support. The request may also include information such as: S-NSSAI, DNN, traffic filter (e.g., IP address or other IDs for counterpart AF 207/AS 208 or UEs 201), predicted location, predicted volume of data to be transferred, etc. UE 201 requests may be provided to the AMF 202 via NAS signaling and forwarded to SMF 204, PCF 210, UDM 203/UDR as needed. A combination of 5GC network functions may process the request and determine an AI/ML communication scheduling policy in response, which may include a unique AI/ML communication scheduling policy ID, which may include QoS rules including QFIs that identifies traffic for AI/ML communications. UE 201 may then attach a QFI associated with AI/ML communications in uplink data packets to identify the traffic and UPF 205 may detect the QFI for reporting and charging purposes. The AI/ML communication scheduling policy may be provided to the counterpart AS/AF by 5GC notifications (direct or via NEF) or the method may rely upon application-level signaling between UE 201 and AF 207/AS 208.

Requests from AF 207/AS 208 for AI/ML transfer sessions may include the same information already detailed for the UE requests. In addition, AF 207/AS 208s may make such requests on behalf of a group of UEs, in which case information about the counterpart UEs may also be included. Such information may be a group ID, a location, a number of UEs to be identified by the 5GC based on provided criteria, etc. AS 208/AF 207 requests may be provided to 5GC via NEF 206 and forwarded to PCF 210, UDM 203/UDR as needed. A combination of 5GC network functions may process the request and determine an AI/ML communication scheduling policy in response, which may include a unique AI/ML communication scheduling policy ID. The AI/ML communication scheduling policy may be provided to the counterpart UE by 5GC NAS signaling or the method may rely upon application-level signaling between the AF 207/AS 208 and UE 201.

AI/ML communication scheduling policy negotiation may be conducted before the PDU session establishment of UE 201 for the purpose of establishing AI/ML traffic. When UE 201 or AF 207/AS 208 requests or prefers to initiate the traffic or to apply the AI/ML communication scheduling policy to an existing PDU Session, then the unique AI/ML communication scheduling policy ID may be included in the request.

Once the PDU session has been established, AI/ML applications running on a UE 201 may use the established PDU session to perform AI/ML operations such as AI/ML model download and providing data for inference, training, or analytics verification. Using local configurations or configurations provided by the network or AF 207/AS 208, an application on UE 201 may identify a particular AI/ML model to download from AS 2028. The model download may include a requested or preferred AI/ML model and accompanied with an AI/ML policy that provides information to UE 201 on how UE 201 may use the model. The AI/ML policy may have also been provided as part of PDU session establishment or from an application function in the network. An example of information in the AI/ML policy is shown in Table 2. Table 2 shows policy specific information, learning information, model information, performance information, and reporting information that UE 201 may use for AI/ML operations. The policy information may include a Policy ID that may be provided in a message that may be sent by UE 201 to the AS 208 in order to indicate to the AS 208 what policy cause UE 201 to send the message. The policy information may include an Application ID that is used by UE 201 to determine what UE 201 applications the policy applies to. The policy information may include a contact address or target URI that is used by UE 201 to determine where to send the message to when UE 201 determines that a message may be sent. The policy information may include learning information that may be used by UE 201 to determine what type of AI/ML data the policy applies to. The policy information may include model information that provides usage information on how to use the downloaded AI/ML model. The policy information may include performance information that indicate to UE 201 what performance measurements may be exposed to the AS. The policy information may include reporting information that is used by UE 201 to determine when reports may be sent.

TABLE 2

| AI/ML Policy Information | |
| --- | --- |
| AI/ML Policy ID | An identifier for the AI/ML policy |
| Application ID | The application ID(s) the AI/ML policy applies to |
| Contact address | The address where to contact an application server such as IP address or port number, an FQDN, or MAC address. |
| Target URI | A target resource that reports may be sent to. |
| Device Information | Information about the UE that could be used to evaluate whether the UE is capable of performing AI/ML operations. Information may include the processor name or type, number of processing cores, presence of AI/ML cores, processor operating frequencies, total installed memory, total flash memory, battery size, radio capability, available sensors, OS ID or version number, etc. |
| Learning Information | |
| AI/ML type | Describes the type of AI/ML this policy applies to: supervised learning, unsupervised learning, reinforcement learning |
| AI/ML purpose | Describes the purpose for model download: model training results, training data, labeled data, inference data, data for analytics verification |
| Model Information | |
| Model name | Name of the model |
| Model ID | Identifier of the model |
| Model Type | Type of the model such as linear regression, decision tree, Support Vector Machine, Naive Bayes, k-Nearest Neighbors, K-Means, Random Forest, Dimensionality Reduction, Gradient Boosting, etc. |
| Model container | Container for the downloaded model |
| Initial parameters | Parameters to initialize the model with, e.g., coefficients used in neural network |
| Input data | List of input data to collect for use with the model |
| Collection period | The time duration data is to be collected |
| Data processing | Data processing requirements for the input data |
| Location | The location where data is to be collected |
| Number of iterations | The number of times the model is to be run or iterate with new data |
| Performance Information | |
| Signal Power | The signal power that the UE measures for the serving cell or other neighbor cells. Examples include RSSI, RSRP, SNIR, etc. |
| Experienced data rate | The data rate the UE experiences in the current location when performing AI/ML operations. The data rate can be both downlink and uplink data rates. |
| Number retransmissions | The number of UL retransmissions the UE performed for the current measurement period |
| Experienced Latency | The end-to-end latency the UE experiences for downlink traffic. The UE or AF/AS may perform measurement protocols to obtain such measurements. |
| Battery level | The battery level of the UE at the time of reporting information to the AF/AS |
| Discharge rate | The battery discharge rate of the UE during the AI/ML operation |
| CPU utilization | The CPU utilization of the UE during the AI/ML operation |
| Memory utilization | The memory utilization of the UE during the AI/ML operation |
| % loading for AI/ML | The percentage loading of AI/ML operations relative to total load of the UE |
| Reporting Information | |
| API name | An API name the UE calls and the associated parameters. |
| Report ID | The identifier for the report |
| Data type | Identifies what data type to report, such as raw data, processed data, labeled data, model training data, feedback data for analytics verification, measurement information |
| Reporting container | Container that consists of data being reported; data may include raw or processed data for inference, raw or processed labeled data for training, intermediate results of model training, measurement or performance information, or other data involved with AI/ML operations |
| Reporting frequency | Describes how often to report output data; value specify the reporting interval that information needs to be reported |
| Reporting window | For time critical reporting, a window that reporting information must be sent within the reporting interval as specify by the reporting frequency |
| Location | Location information where the data was collected from or used for AI/ML operations, whether the data is for inference, training, model results, etc. |
| Timestamp | The date and time the report was made |

The AI/ML policy may include information for identifying the type and purpose of the AI/ML operations. First, the policy may identify the types of learning the model is intended for, from supervised learning, to unsupervised learning, or to reinforcement learning. Other types of learning may also be specified, such as hybrid learning (e.g., a combination of supervised and unsupervised learning), multi-instance learning, multi-task learning, active learning, etc. Typically, these types of learning may be based on the main types of learning, whether it is a combination of supervised and unsupervised learning or a variant of one of the main learning types. Second, a purpose of a model may involve generating model training results, where data is pass as inputs into a split AI/ML model and intermediate results from the model is uploaded to the AF 207/AS 208. Other purposes may be generating training or labeled data respectively for unsupervised or supervised learning and collecting or formatting data for AI/ML inference in the AF 207/AS 208. Data may also be collected and formatted for use in verifying predictions made based on NWDAF analytics.

Model information included in the AI/ML policy may provide the details of the models or the usage of the models. The details of the model may include the model name, an identifier for the model, the type of model, or a container for the model download. In addition, information on the usage of the model may also be provided, such as parameters to initialize the model, what input data to collect and a collection period, data processing requirements, the location of data collection, number of iterations to run the model with new input data, etc. Data processing requirements may involve normalization, saturation logic, applying statistical operations, data transformation, etc.

An aspect of AI/ML operations may involve the evaluation or selection of UEs 201 to perform AI/ML operations within a certain period of time or when UE 201 is in a certain location as required with federated learning. In order for the AF 207/AS 208 to make such evaluation or selection, UEs 201 may need to report device capability and performance measurements to the AF 207/AS 208. After establishing a PDU session and receiving contact information of the AF 207/AS 208, UE 201 may send device information in a message to the AF 207/AS 208 or respond to a request from an AF 207 to provide the device information. The message may include for example the processor name or type, the number of processing cores or their operating frequencies, presence or capability of AI/ML cores, total installed memory, total flash memory, battery size, radio capability, available sensors, etc. This information describes the capability of UE 201 and allows the AF 207/AS 208 to determine if UE 201 is capable of performing the desired AI/ML operations.

Once AI/ML operations have completed, UE 201 may need to report the AI/ML data that are produced and notify the AF 207/AS 208 the results. The AI/ML policy may include reporting information that specifies what information and at what interval and frequency to report the information. The report information may include an API name to call to send the data to the AF 207/AS 208. A report ID is attached to the report and the data type may be included to indicate what AI/ML data is sent with the report. A location indication or timestamp indication may provide identifying information on where or when the report was sent from. In addition, specified performance information may be included in the report to the AF 207/AS 208.

Figure 5:
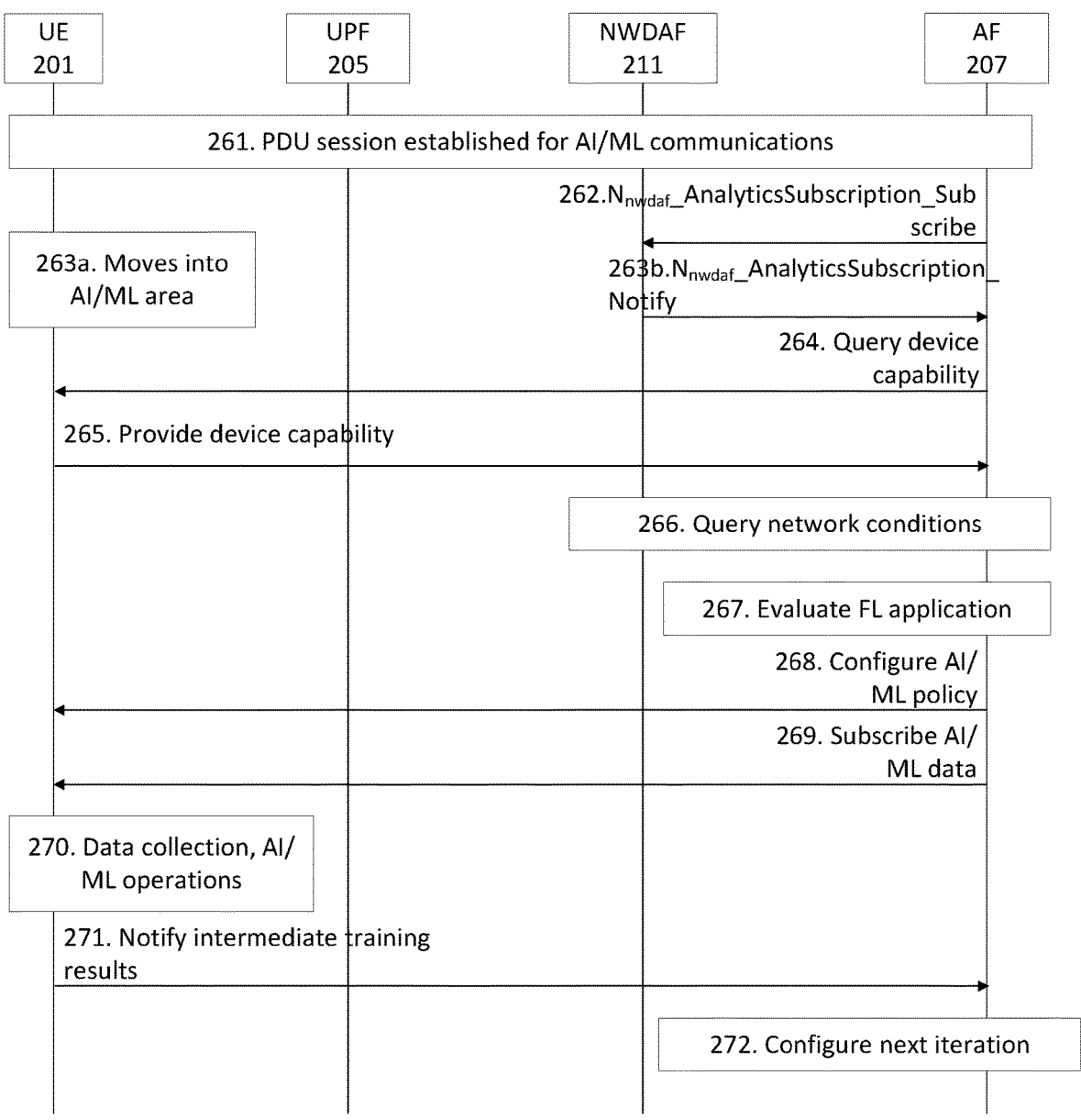
FIG. 5 illustrates a federated learning in 5GS.

Using information from the AI/ML policy received from the network or AF 207/AS 208, an application on UE 201 may trigger AI/ML operations by loading the downloaded AI/ML model or applying initial parameters to the model. If the policy requires UE 201 to collect performance or measurement information, the application may call APIs between the application layer and the NAS or PDU layer to obtain measurements from UE 201. For example, the AI/ML policy may have a function that requires UE 201 to provide signal strength, data rate, number of UL retransmissions, location information, etc. in order to compute user experience analytics on UE 201. The application may need to call OS APIs in order to collect the needed data, format the data appropriately for input into the model, or extract the output from the model, possibly to be used as performance data to return to the AF 207/AS 208, to be used as part of an input in a training data set, or be included into a labeled data set for supervised learning. Common information found in the AI/ML policy are the AI/ML policy ID, application ID(s) the policy applies to, a contact address where UE 201 may communicate with an AF 207/AS 208, or target URI reports may be sent to. FIG. 5 shows an example procedure of the interactions between AF 207 and a UE 201 for AI/ML communications. The procedure describes how federated learning may be envisioned to operate in the 5G or the like system.

At step 261, UE 201 has established a PDU session that allows for AI/ML communications. As part of the PDU session establishment, UE 201 may receive AI/ML triggering rules that identifies events that triggers UE 201 to report information to an AF 207/AS 208 for evaluation of AI/ML operations. For example, a triggering rule may indicate to UE 201 that UE 201 may send the UE's device capability to AS 208 upon entering a certain area or cell within the 5G network. The information sent by UE 201 may be used by AF 207 to determine if AI/ML operations may be performed by UE 201.

At step 262, an AF 207 may subscribe to get notifications from the NWDAF 211 on UE mobility into and out of a designated AI/ML area. AF 207 may call the service operation $N_{nwdaf}$_AnalyticsSubscription_Subscribe with an Analytics ID of UE Mobility, a Target of Analytics Reporting with the UE ID or a group ID if UE 201 belongs to the group, a specified Area of Interest that corresponds to the AI/ML area, and an analytics target period.

At step 263, UE 201 may move into the target AI/ML area as shown in step 263a and as a result, the NWDAF 211 may send a notification to AF 207 in step 263b. NWDAF may call the service operation $N_{nwdaf}$_AnalyticsSubscription_Notify and may provide the UE mobility analytics predictions for when UE 201 enters the AI/ML area. Note that as part of the UE mobility analytics prediction, the notification may have been sent to the AF prior to UE 201 entering the AI/ML area.

At step 264, addition to AI/ML triggering rules, AF 207 may also query UE 201 for its device capability to help AF 207 determine if UE 201 is a candidate for AI/ML operations. AF 207 may have obtained the contact address of UE 201 previously after being notified by NWDAF 211 or AF 207 may have obtained the information from SMF 204 when the PDU session was established for AI/ML communications, e.g., AF 207 subscribed to be notified from SMF 204 for when PDU sessions are established for AI/ML communications.

At step 265, in response to AI/ML triggering rules or AF query, UEs 201 may end a message with information about its capability to AF 207 using the contact information it has for AF 207. The contact information may have been provided to UE 201 for example during PDU session establishment procedure, as part of local configuration of UE 201, or provided by AF 207 over the application layer. The information sent by UE 201 may include the processor name or type, number of processing cores, presence of AI/ML cores, processor operating frequency, total installed memory, total flash memory, battery size, radio capability, available sensors, OS ID or version number, etc. As an alternative, UE 201 may send the message with device information to AF 207 based on a triggering rule and the fact UE 201 is entering an area specified by the rule. In the alternative method, AF 207 may not need to query UE 201 for the device capability as the AI/ML triggering rules may initiate UE 201 to send the information, e.g., whenever UE 201 enters an AI/ML area, a triggering rule may automatically initiate UE 201 to send the device capability to AF 207/AS 208.

At step 266, AF 207 may query NWDAF 211 to find analytics on the condition of the network in the designated area. AF 207 may call the service operation $N_{nwdaf}$_AnalyticsSubscription_Subscribe to subscribe to get notifications on statistics of Analytics IDs such as network performance or NF load information. AF 207 may also contact other network functions such as AMF 202 or SMF 204 to find the number of UEs 201 currently in the area and also how many PDU sessions have been established for AI/ML communications. AF 207 may also query other UEs 201 that may be in the AI/ML area for their device information.

At step 267, using the information obtained from the network and UEs 201, AF 207 may perform an evaluation of the feasibility of running a federated learning model in the area. AF 207 may determine if enough UEs 201 are available in the area to perform partial model training or whether those UEs 201 have the capability to complete the tasks for the desired number of iterations. As part of the evaluation, AF 207 may consider the network loading, the number of active PDU sessions for AI/ML communications, the predicted UE 201 mobility into and out of the area, the processor hardware and running frequencies, the battery level of the UEs 201, memory utilizations, etc.

At step 268, AF 207 may determine the network conditions and the available UEs 201 in the area for AI/ML communications are sufficient to run the federated learning model. As a result, AF 207 may proceed to select the UEs 201 that are capable of performing the required AI/ML operations or may send the UEs 201 AI/ML policies with the appropriate AI/ML model. The AI/ML policy may include the information listed in Table 2. In addition to providing the learning and model information, the AI/ML policy may also include performance information that the AF 207 requests the UEs 201 to send performance measurements with the required reporting information. Note that the performance measurements may be sent at a different interval (e.g., more frequent interval) than the reporting interval.

At step 269, AF 207 may subscribe to receive notifications from UE 201 for when the AI/ML data are available. Depending on the AI/ML operation, UE 201 may need to iterate through multiple data collections or training cycles and provide intermediate data from each iteration. Alternatively, the AF 207 may make a request instead of a subscription to obtain the AI/ML data from UE 201. The request may be a long-polled request, or the request may just be a regular polling request.

At step 270, AI/ML application identified by the application ID of the AI/ML policy launches on UE 201 and proceeds to initiate the AI/ML operation. The application may initialize the AI/ML model with parameters provided in the AI/ML policy and begin the data collection process. If necessary, the application may post-process the collected data and run the model training for the specified number of iterations. At or about the same time, UE 201 may collect performance measurements as indicated in the AI/ML policy.

At step 271, when the number of iterations has been completed, the application may prepare the intermediate training results and may call the appropriate API to package the contents for transmission to AS 208. The application may also include the performance measurements with the rest of the reporting data. UE 201 may upload the report with the required information to AS 208. Since this training is part of a global federated learning model, the application may need to ensure the report is sent within the reporting window in order for the next iteration to proceed.

At step 272, AF 207 may evaluate the reports received from UEs 201 for this iteration and may apply the intermediate training results to the global FL model. Using the performance measurements from UEs 201 and also performance measurements from other UEs 201 that were not selected for the current iteration, the AF 207 may perform UE selection for the next iteration. AF 207 may also factor the analytics received from the NWDAF 211 on network conditions as well as UE mobility into the AI/ML area during the selection process. Once the AF 207 has completed the UE selection process, AF 207 may send the selected UEs 201 with updated AI/ML policies to begin the next iteration. Some of the selected UEs 201 may be the same or different from the selected UEs 201 in the previous iteration. At step 265 of FIG. 5 through step 267 of FIG. 5 may be repeated for the next iteration.

Figure 6:
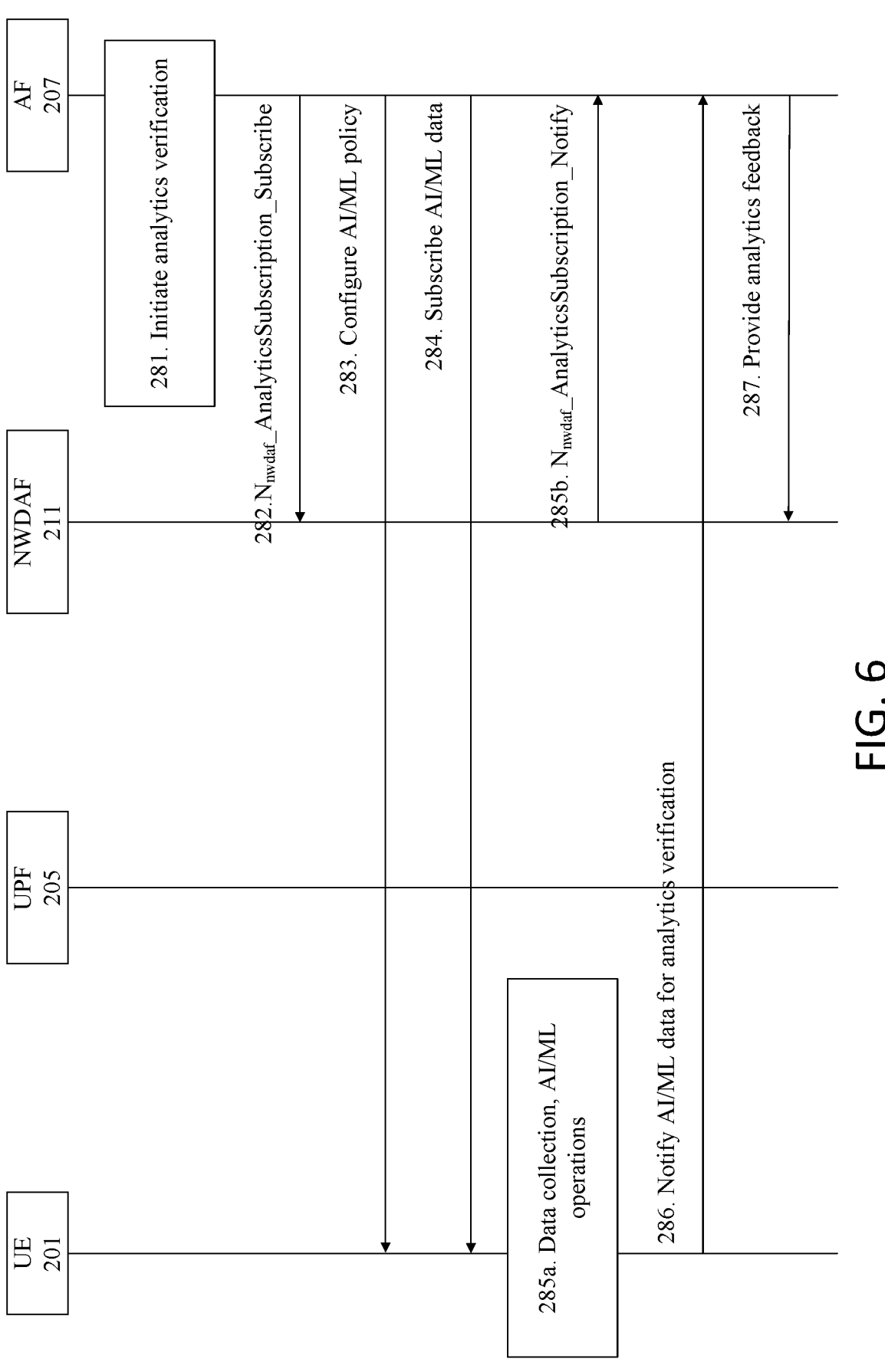
FIG. 6 illustrates a UE-provided NWDAF analytics verification.

A possible benefit of making application-level AI/ML operations in UEs 201 available to the AF 207 may be the enablement of the 5G system to provide a solution for verifying the analytics generated by the NWDAF 211. As previously described, NWDAF 211 may provide statistics or predictions for various Analytics IDs that captures different aspects of the operation of the 5G network. For UE centric Analytics IDs, the prediction results may be complemented by the actual results that are experienced by UEs 201 for which the predictions are targeting. AF 207/AS 208 may subscribe to receive predictions about the mobility of a group of UEs 201 or of a single UE 201. AF 207/AS 208 may then configure an AI/ML policy for the target UE(s) 201 to collect location information for a certain duration of time or report the locations at a determined time or interval. AF 207/AS 208 may then correlate the predictions provided by NWDAF 211 with the information provided by UE(s) 201 or compare the actual results with those of the predictions. For example, the UE Mobility Analytics ID has among its prediction outputs UE location, confidence, or ratio. AF 207/AS 208 may compare the actual UE locations with those of the predicted UE locations and determine whether the confidence level for the prediction was appropriate. AF 207/AS 208 may make this comparison over a certain period and provide feedback to the NWDAF 211 to adjust the confidence level appropriately. FIG. 6 illustrates UE-provided NWDAF analytics verification.

At step 281, AF 207 may request or prefer to initiate verification of the analytics generated by NWDAF 211. AF 207 may be deployed by the network operator to evaluate the accuracy of the predictions made by NWDAF 211. Alternatively, AF 207 may operate in conjunction with the ML capability of NWDAF 211 to support the further training of ML models. AF 207 may be able to provide the expected data for a labeled data set used to continue training an ML model. UE 201 may also have established a PDU session that supports AI/ML communications and UE 201 may be in a location and time where UE 201 may provide verification for prediction analytics from NWDAF 211 or provide training data for ML models. If AF 207 supports a service interface for NWDAF 211 to be notified of analytics feedback, the NWDAF 211 may subscribe for analytics verification using the interface. AF 207 exposed interface may be described in more detail hereinafter.

At step 282, AF 207 may perform an $N_{nwdaf\_}$Analytics-Subscription_Subscribe service operation on one or more Analytics IDs. In the subscription, AF 207 may request the NWDAF 211 to provide predictions on UE related analytics, such as service experience, UE mobility, UE communications, abnormal behaviors, user data congestion, etc. The analytics may target a single UE 201 or a group of UEs 201. If AF 207 is operating to support the ML capability of NWDAF 211, a new exposure interface may need to be defined that is similar to the $N_{nwdaf\_}$MLModel Provision_Subscribe and the $N_{nwdaf\_}$MLModelInfo_Request service operations defined in section 6.2A of TS 23.288. The new exposure interface may allow AF 207 to access ML models available in NWDAF 211. Alternatively, the existing exposure interface may be extended to allow AFs 207 access to the ML capability of NWDAF 211.

At step 283, then AF 207 may provision an AI/ML policy to UE 201 to report information that AF 207 has subscribed to from NWDAF 211. The report information may represent the predictions that the NWDAF 211 will provide about UE 201. The information UE 201 reports may be the actual data as experienced by UE 201 and may be compared to the prediction from NWDAF 211. If UE 201 is operating to support the ML capability of NWDAF 211 or AF 207, the report information may represent the intermediate results of split AI/ML model training or the expected data of a labeled data set for an ML model.

At step 284, AF 207 may subscribe to receive notifications from UE 201 for when the AI/ML data are available. Depending on the AI/ML operation, UE 201 may need to iterate through multiple data collections or training cycles and provide intermediate data from each iteration. Alternatively, AF 207 may make a request instead of a subscription to obtain the AI/ML data from UE 201. The request may be a long-polled request, or the request may just be a regular polling request.

UE 201 may start data collection in step 285*a* for the requested information and if necessary, post-process the data into a format as specified by the AI/ML policy. UE 201 may also collect performance data to provide to AF 207 if requested by the AI/ML policy. Depending on the AI/ML policy, UE 201 may perform the specified AI/ML operations, which may include iterating data through split AI/ML models, packaging data for inference, generating labeled data sets, providing data for analytics verification, etc. When NWDAF 211 has collected enough data and is able to provide predictions for the subscribed analytics, NWDAF 211 may call the service operation $N_{nwdaf\_}$AnalyticsSubscription_Notify in step 285*b* of FIG. 6. The notification message may provide the prediction outputs for the subscribed analytics IDs. For example, the prediction outputs for the UE communication analytics ID includes periodic time, traffic characterization, traffic volume, confidence, list of applications in use, the probable occurrence of application usage in UE 201, the spatial validity, etc. Sometimes this step 285*b* may be skipped if AF 207 is operating to support the ML capability of NWDAF 211 or AF 207 is requesting UE support of AF 207 performing AI/ML operations.

At step 286, when UE 201 has generated the required information, UE 201 may send the AI/ML data to AF 207. In this case, the AI/ML data may be used for verifying the prediction analytics generated by the NWDAF 211. If the AI/ML operation was to support the ML capability of NWDAF 211 or AF 207, the AI/ML data may be intermediate AI/ML model results, data for inference, or labeled and unlabeled data set.

At step 287, after receiving data from both NWDAF 211 and UE 201, the AF 207 may compare the prediction outputs from NWDAF 211 with the verification data provided by UE 201 and may determine an error value between the prediction and the actual metric. AF 207 may make the determination over multiple iterations of data and when the evaluation involves a group of UEs 201, the AF 207 may require data from all or a subset of member UEs 201 of the group. Then the AF 207 may send NWDAF 211 a message with the analytics feedback and may include a verification confidence or level. The verification confidence or level may represent the amount or completeness of data used in the verification process, the number of UEs 201 from which the AF 207 was able to obtain verification data from, the timeliness of data received from UE 201 (e.g., how recently the data was received), etc. If AF 207 was operating to support the ML capability of NWDAF 211, AF 207 may provide the results of the AI/ML operations to NWDAF 211.

In addition to the subscription/notification mechanism AF 207 may employ to obtain performance or AI/ML data from UE 201 as shown in FIG. 6, AF 207 may also perform polling requests to UE 201. AF 207 may poll UE 201 for performance only, AI/ML only, or both types of data on demand. More detailed description provided herein.

Communications Interface Exposure: A consideration for enabling AI/ML communications in 5G systems is the ability to monitor AI/ML communication characteristics and performance. As such, network performance metrics provide an important consideration for AF 207 to determine whether AI/ML operations may be performed reliably and within the required time constraints in the 5G network. In addition, the capability and availability of UEs 201 in the targeted area for AI/ML operations is another important consideration for an AF 207 to have exposure to UE performance information, such as processor and memory utilization and battery level, may also be required.

Performance information in the network and in UE 201 may be made available to AF 207 to support AI/ML communications while AF 207 may expose a service operation for the NWDAF 211 to perform verification of analytics predicative outputs. Conventionally, AF 207 has access to network analytics generated by NWDAF 211 that provides statistics and predictions on, e.g., network performance and UE mobility. However, ML model capability in the NWDAF 211 is only available to other NWDAF 211 instances in the 5G network. As a result, the NWDAF 211 service operations DataManagement, MLModelProvision, and MLModelInfo may need to be extended to AFs to allow for coordination of AI/ML model training and for the sharing of data for inference or for labeled and unlabeled training data. These service operations may be extended to Afs 207 or new service operations may need to be defined. In addition, a new service operation, e.g., $N_{af\_}$AnalyticsVerification, may be defined for NWDAF 211 to request analytics verification from AF 207 for the predictions provided by NWDAF 211. In the example of FIG. 6, NWDAF 211 may subscribe to receive analytics verification from AF 207 in step 281 and the AF 207 may provide the analytics verification in the notification sent to NWDAF 211 in step 287. Table 3 shows the new service operation for AF 207 analytics verification.

TABLE 3

Example of new AF service for Analytics Verification

| Service Name | Service Operations | Operation Semantics | Example Consumer(s) |
|---|---|---|---|
| Naf_EventExposure | Subscribe | Subscribe/Notify | NEF, NWDAF |
| | Unsubscribe | | NEF, NWDAF |
| | Notify | | NEF, NWDAF |
| Naf_ProSe | AuthorizeDiscovery | Request/Response | 5G DDNMF |
| Naf_AnalyticsVerification | Subscribe | Subscribe/Notify | NEF, NWDAF |
| | Unsubscribe | | NEF, NWDAF |
| | Notify | | NEF, NWDAF |

The service operation $N_{af\_}$AnalyticsVerification_Subscribe may have the following inputs: Subscription ID, Analytics ID to be verified, the associated Analytics ID prediction outputs, verification requirements, notification frequency, subscription expiration, or filter information for the verification output. AF 207 may use the output predictions of the analytics ID to identify which output needs to be verified and under what conditions to apply the verification. The verification requirements may specify how much data is required for verification and whether verification may be made with incomplete data, e.g., with only data from a subset of group members. The notification frequency specifies how often to provide notifications or only send notifications when the verification requirements are met. A subscription expiration may be set to automatically delete the subscription. This may be used to align with the analytics periods within NWDAF 211 to minimize signaling between NWDAF 211 and AF 207. The output of this service operation may include an acknowledgement of acceptance of the subscription, the subscription ID, or possibly an expiration for the subscription.

The service operation $N_{af\_}$AnalyticsVerification_Unsubscribe may have the following input: subscription ID. This service operation may cancel or remove the subscription as indicated by the subscription ID. The output of the service operation may be an acknowledgement from UE 201 that the operation was received and that the subscription may be deleted.

The service operation $N_{af\_}$AnalyticsVerification_Notify may have the following inputs: notification ID, UE ID, verification Data, or time stamp. The notification ID may be an identifier use to associate notification messages to the corresponding subscription. Thus, the notification ID may be a combination of the subscription ID or a notification number, which is used to represent a sequence of notifications. The notification number may be used for when AF 207 is expected to provide continuous notifications, e.g., to provide training data over multiple iterations. The UE ID identifies UE 201 that the notification is for and the time stamp provides the time in which the notification was sent. The verification data represents the AI/ML data AF 207 has obtained from UE 201 and formatted appropriately to align with the format of the analytics data that AF 207 is providing verification for. There is no output generated for responding to the notification.

UEs 201 may need to expose certain capability and performance metrics to AFs 207 to enable AI/ML operations to be performed on the UEs 201. Currently, there is no defined exposure of the UE information or data to network functions. The exposure of UE AI/ML capabilities and performance data may be achieved by defining a service-based interface between an AI/ML enabler client in UE 201 and AF 207. Alternatively, API calls may be defined to carry AI/ML data and performance information from UE 201 to the AF 207/AS 208. Table 4 defines a new service-based interface between UEs 201 and AFs 207 to enable AI/ML communications in the 5G system. The defined service operations allow AF 207 to query for a UE's AI/ML capability, configure a UE 201 with AI/ML policy, and obtain AI/ML data from UE 201. These services, which may be provided by an AI/ML enabler client in UE 201, may be invoked by AF 207.

TABLE 4

New UE Service-based Interface for AI/ML Communications

| Service Name | Service Operations | Operation Semantics | Example Consumer(s) |
|---|---|---|---|
| Nue_AIMLCapability | Request | Request/Response | AF |
| Nue_AIMLPolicy | Configure | Request/Response | AF |
| Nue_AIMLData | Subscribe | Subscribe/Notify | AF |
| | Unsubscribe | | AF |
| | Notify | | AF |
| | Request | Request/Response | AF |

Whenever AF 207 wants to query UE 201 about the UE's AI/ML capability, AF 207 may initiate the service operation $N_{ue\_}$AIMLCapability_Request. AF 207 may use the information received from UE 201 to assess whether UE 201 is a candidate for AI/ML operations. The service operation $N_{ue\_}$AIMLCapability_Request may have the following inputs: request ID or requested AI/ML operation. The output of the $N_{ue\_}$AIMLCapability_Request service operation may include: request ID, UE ID, consent, or available device information of UE 201. Examples of UE device information may include: processor name or type, number of processing cores, presence of AI/ML cores, operating frequency, total installed memory, total flash memory, battery size, radio capability, available sensors, OS ID or version number. The consent output may specify UE 201 (e.g., user) agrees to the requested AI/ML operation and in addition, what other types of AI/ML operations or data UE 201 may also agree to. In addition, a time stamp may be provided in the output.

After AF 207 has determined UE 201 is capable of performing AI/ML operations, AF 207 may trigger the service operation $N_{ue\_}$AIMLPolicy_Configure to configure an AI/ML policy to UE 201. The service operation $N_{ue\_}$AIMLPolicy_Configure may have the following inputs: request ID, policy ID, or AI/ML policy. The policy ID may be used to reference the contents of the AI/ML policy and to differentiate from other AI/ML policies UE 201 may already have. AI/ML policy may include information as shown in Table 2. UE 201 acknowledges AF 207 that UE 201 received the AI/ML policy, which is the output of the service operation.

When AF 207 has configured an AI/ML policy on UE 201 and AI/ML operations commence, there are various service operations AF 207 may initiate. AF 207 may subscribe to receive AI/ML data from UE 201 using the N$_{ue\_}$AIMLData_Subscribe service operation, unsubscribe from a previous subscription for AI/ML data using the N$_{ue\_}$AIMLData_Unsubscribe service operation, receive a notification from UE 201 with AI/ML data according to a previous subscription using the N$_{ue\_}$AIMLData_Notify service operation, and directly request for AI/ML data without a subscription using the N$_{ue\_}$AIMLData_Request service operation. Each of the service operations is described in more detail herein.

The service operation N$_{ue\_}$AIMLData_Subscribe may have the following input: subscription ID, policy ID, data type, or notification frequency. This service operation may subscribe AF 207 to receive notifications from UE 201 for the indicated policy ID. The AI/ML policy that the policy ID relates to may include the performance and reporting information UE 201 may send to AF 207. AF 207 may specify what data types UE 201 may report: performance or AI/ML data. AF 207 may also specify the notification frequency in which UE 201 may send the notifications. For performance information, the frequency may be specified as a reporting interval but for AI/ML data, the frequency may be specified as the number of iterations UE 201 performs AI/ML operation and reports the data after each iteration. The output of this service operation may include an acknowledgement of acceptance of the subscription, the subscription ID, or an expiration for the subscription.

The service operation N$_{ue\_}$AIMLData_Unsubscribe may have the following inputs: subscription ID or policy ID. This service operation may cancel or remove the subscription associated with the policy ID as indicated by the subscription ID. The output of the service operation is an acknowledgement from UE 201 that the operation was received and that the subscription may be deleted.

The service operation N$_{ue\_}$AIMLData_Notify may have the following inputs: notification ID, performance information, AI/ML data, or timestamp. The notification ID may be an identifier used to associate notification messages to the corresponding subscription. Thus, the notification ID may be a combination of the subscription ID and a notification number, which is used to represent a sequence of notifications. The notification number may be used for when UE 201 is expected to provide continuous notifications, e.g., to provide training data over multiple iterations. The data sent to AF 207 may be performance data, AI/ML data, or both types of data. What data is sent to AF 207 is determined by the AI/ML policy that was configured on UE 201 prior to the start of AI/ML operations. A timestamp may also be included in the notification sent to AF 207. There is no output generated for responding to the notification.

The service operation N$_{ue\_}$AIMLData_Request may have the following inputs: request ID, policy ID, request type, data type, or data requested. This service operation may be initiated directly by an AF in place of or in addition to making a subscription. The policy ID may identify the requested data from the associated AI/ML policy that was configured onto UE 201 prior to the start of AI/ML operations. The request type specifies whether the request is for regular polling requests or long-polling requests. The data type specifies whether performance data, AI/ML data, or both types of data is being requests. Finally, the data requested may specify a specific data set that AF 207 is requesting from UE 201. When present, this input may override the data type input and may direct UE 201 to only provide the data listed in the data requested field.

Figure 7:
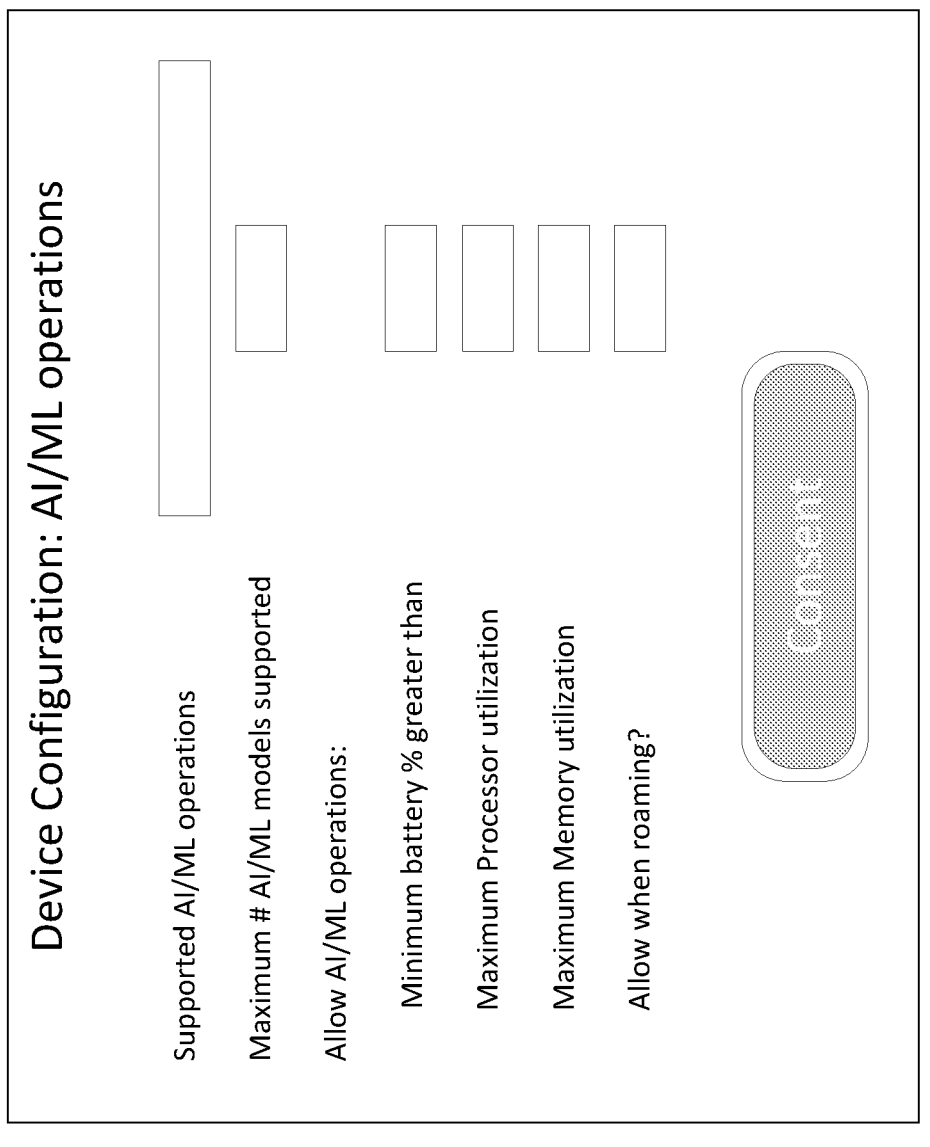
FIG. 7 illustrates an example graphical user interface.

FIG. 7 illustrates an example graphical user interface that may be presented to the user of UE 201 to configure UE 201 for AI/ML operations. GUI 290 may be presented by an AI/ML enabler client on UE 201 and the information from the GUI 290 may be used, e.g., in AI/ML triggering rules as previously described. The user may configure the AI/ML operations that UE 201 can support, the maximum number of AI/ML models that can run on UE 201, and when AI/ML operations are allowed to run on UE 201. The user may limit AI/ML operations to only run when UE 201 has a minimum battery level and the maximum utilization the AI/ML operations may incur for processor utilization or memory utilization. The user may also configure whether AI/ML operations are allowed when UE 201 is roaming. The user may then press the consent button to configure UE 201 for AI/ML operations.

It is understood that the entities performing the steps illustrated herein, such as FIG. 1-FIG. 7, may be logical entities. The steps may be stored in a memory of, and executing on a processor of, a device, server, or computer system such as those illustrated in FIG. 8F or FIG. 8G. Skipping steps, combining steps, or adding steps between exemplary methods disclosed herein (e.g., FIG. 2-FIG. 6) is contemplated. Table 5 provides exemplary abbreviations and definitions.

TABLE 5

| Abbreviations and Definitions | |
| --- | --- |
| Abbreviations | Definitions |
| 3GPP | Third Generation Partnership Project |
| 5GS | 5G System |
| AF | Application Function |
| AI | Artificial Intelligence |
| AKA | Authentication and Key Agreement |
| AMF | Access and Mobility Management Function |
| AnLF | Analytics logical function |
| API | Application Programming Interface |
| AR | Augmented Reality |
| AS | Application Server |
| CN | Core Network |
| DNN | Data Network Name |
| FL | Federated Learning |
| FQDN | Fully Qualified Domain Name |
| GUI | Graphical User Interface |
| KPI | Key Performance Indicator |
| ML | Machine Learning |
| MNO | Mobile Network Operator |
| MoS | Mean Opinion Score |
| MTLF | Model training logical function |
| NAS | Non-Access Stratum |
| NEF | Network Exposure Function |
| NS | Network Slice |
| NSSAI | Network Slice Selection Assistance Information |
| OAM | Operation Administration and Maintenance |
| OS | Operating System |
| PCF | Policy Control Function |
| PCO | Protocol Configuration Options |
| PDU | Protocol Data Unit |
| QFI | QoS Flow Identifier |
| QoS | Quality of Service |
| RAN | Radio Access Network |
| RSRP | Reference Signal Received Power |
| RSSI | Received Signal Strength Indicator |
| SM | Session Management |
| SMF | Session Management Function |
| SNIR | Signal-to-Noise and Interference Ratio |
| S-NSSAI | Single Network Slice Selection Assistance Information |
| SST | Slice Service Type |
| UDM | Unified Data Management |
| UDR | Unified Data Repository |
| UE | User Equipment |

TABLE 5-continued

| Abbreviations and Definitions | |
| --- | --- |
| Abbreviations | Definitions |
| UPF | User Plane Function |
| URI | Uniform Resource Identifier |
| VR | Virtual Reality |

The 3rd Generation Partnership Project (3GPP) develops technical standards for cellular telecommunications network technologies, including radio access, the core transport network, and service capabilities—including work on codecs, security, and quality of service. Recent radio access technology (RAT) standards include WCDMA (commonly referred as 3G), LTE (commonly referred as 4G), LTE-Advanced standards, and New Radio (NR), which is also referred to as "5G". The disclosed subject matter may apply beyond 5G systems (e.g., 4G or 6G). 3GPP NR standards development is expected to continue and include the definition of next generation radio access technology (new RAT), which is expected to include the provision of new flexible radio access below 7 GHz, and the provision of new ultra-mobile broadband radio access above 7 GHz. The flexible radio access is expected to consist of a new, non-backwards compatible radio access in new spectrum below 6 GHz, and it is expected to include different operating modes that may be multiplexed together in the same spectrum to address a broad set of 3GPP NR use cases with diverging requirements. The ultra-mobile broadband is expected to include cmWave and mmWave spectrum that will provide the opportunity for ultra-mobile broadband access for, e.g., indoor applications and hotspots. In particular, the ultra-mobile broadband is expected to share a common design framework with the flexible radio access below 7 GHz, with cmWave and mmWave specific design optimizations.

3GPP has identified a variety of use cases that NR is expected to support, resulting in a wide variety of user experience requirements for data rate, latency, and mobility. The use cases include the following general categories: enhanced mobile broadband (eMBB) ultra-reliable low-latency Communication (URLLC), Non-Terrestrial Networks (NTN), massive machine type communications (mMTC), network operation (e.g., network slicing, routing, migration and interworking, energy savings), and enhanced vehicle-to-everything (eV2X) communications, which may include any of Vehicle-to-Vehicle Communication (V2V), Vehicle-to-Infrastructure Communication (V2I), Vehicle-to-Network Communication (V2N), Vehicle-to-Pedestrian Communication (V2P), and vehicle communications with other entities. Specific service and applications in these categories include, e.g., monitoring and sensor networks, device remote controlling, bi-directional remote controlling, personal cloud computing, video streaming, wireless cloud-based office, first responder connectivity, automotive ecall, disaster alerts, real-time gaming, multi-person video calls, autonomous driving, augmented reality, tactile internet, virtual reality, home automation, robotics, and aerial drones to name a few. All of these use cases and others are contemplated herein.

Figure 8A:
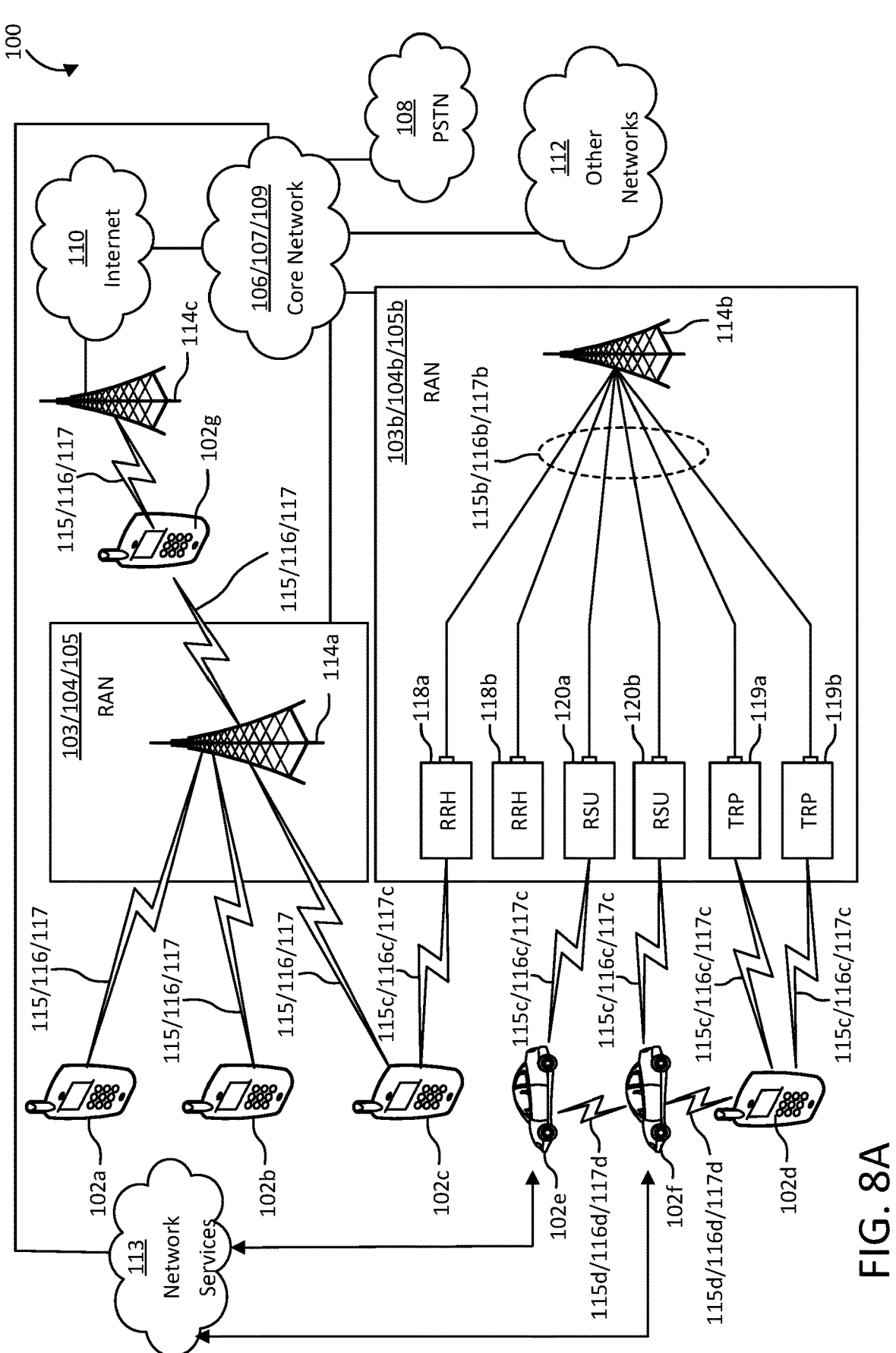
FIG. 8A illustrates an example communications system.

FIG. 8A illustrates an example communications system 100 in which the methods and apparatuses of 5G support for AI/ML communications, such as the systems and methods illustrated in FIG. 1 through FIG. 7 described and claimed herein may be used. The communications system 100 may include wireless transmit/receive units (WTRUs) 102a, 102b, 102c, 102d, 102e, 102f, or 102g (which generally or collectively may be referred to as WTRU 102 or WTRUs 102). The communications system 100 may include, a radio access network (RAN) 103/104/105/103b/104b/105b, a core network 106/107/109, a public switched telephone network (PSTN) 108, the Internet 110, other networks 112, and Network Services 113. Network Services 113 may include, for example, a V2X server, V2X functions, a ProSe server, ProSe functions, IoT services, video streaming, or edge computing, etc.

It will be appreciated that the concepts disclosed herein may be used with any number of WTRUs, base stations, networks, or network elements. Each of the WTRUs 102a, 102b, 102c, 102d, 102e, 102f, or 102g may be any type of apparatus or device configured to operate or communicate in a wireless environment. Although each WTRU 102a, 102b, 102c, 102d, 102e, 102f, or 102g may be depicted in FIG. 8A, FIG. 8B, FIG. 8C, FIG. 8D, FIG. 8E, or FIG. 8F as a hand-held wireless communications apparatus, it is understood that with the wide variety of use cases contemplated for 5G wireless communications, each WTRU may comprise or be embodied in any type of apparatus or device configured to transmit or receive wireless signals, including, by way of example only, user equipment (UE), a mobile station, a fixed or mobile subscriber unit, a pager, a cellular telephone, a personal digital assistant (PDA), a smartphone, a laptop, a tablet, a netbook, a notebook computer, a personal computer, a wireless sensor, consumer electronics, a wearable device such as a smart watch or smart clothing, a medical or eHealth device, a robot, industrial equipment, a drone, a vehicle such as a car, bus, truck, train, or airplane, and the like.

The communications system 100 may also include a base station 114a and a base station 114b. In the example of FIG. 8A, each base stations 114a and 114b is depicted as a single element. In practice, the base stations 114a and 114b may include any number of interconnected base stations or network elements. Base stations 114a may be any type of device configured to wirelessly interface with at least one of the WTRUs 102a, 102b, and 102c to facilitate access to one or more communication networks, such as the core network 106/107/109, the Internet 110, Network Services 113, or the other networks 112. Similarly, base station 114b may be any type of device configured to wiredly or wirelessly interface with at least one of the Remote Radio Heads (RRHs) 118a, 118b, Transmission and Reception Points (TRPs) 119a, 119b, or Roadside Units (RSUs) 120a and 120b to facilitate access to one or more communication networks, such as the core network 106/107/109, the Internet 110, other networks 112, or Network Services 113. RRHs 118a, 118b may be any type of device configured to wirelessly interface with at least one of the WTRUs 102, e.g., WTRU 102c, to facilitate access to one or more communication networks, such as the core network 106/107/109, the Internet 110, Network Services 113, or other networks 112

TRPs 119a, 119b may be any type of device configured to wirelessly interface with at least one of the WTRU 102d, to facilitate access to one or more communication networks, such as the core network 106/107/109, the Internet 110, Network Services 113, or other networks 112. RSUs 120a and 120b may be any type of device configured to wirelessly interface with at least one of the WTRU 102e or 102f, to facilitate access to one or more communication networks, such as the core network 106/107/109, the Internet 110, other networks 112, or Network Services 113. By way of example, the base stations 114a, 114b may be a Base Transceiver Station (BTS), a Node-B, an eNode B, a Home Node B, a Home eNode B, a Next Generation Node-B (gNode B), a satellite, a site controller, an access point (AP), a wireless router, and the like.

The base station 114a may be part of the RAN 103/104/105, which may also include other base stations or network elements (not shown), such as a Base Station Controller (BSC), a Radio Network Controller (RNC), relay nodes, etc. Similarly, the base station 114b may be part of the RAN 103b/104b/105b, which may also include other base stations or network elements (not shown), such as a BSC, a RNC, relay nodes, etc. The base station 114a may be configured to transmit or receive wireless signals within a particular geographic region, which may be referred to as a cell (not shown). Similarly, the base station 114b may be configured to transmit or receive wired or wireless signals within a particular geographic region, which may be referred to as a cell (not shown) for methods, systems, and devices of 5G support for AI/ML communications, as disclosed herein. Similarly, the base station 114b may be configured to transmit or receive wired or wireless signals within a particular geographic region, which may be referred to as a cell (not shown). The cell may further be divided into cell sectors. For example, the cell associated with the base station 114a may be divided into three sectors. Thus, in an example, the base station 114a may include three transceivers, e.g., one for each sector of the cell. In an example, the base station 114a may employ multiple-input multiple output (MIMO) technology and, therefore, may utilize multiple transceivers for each sector of the cell.

The base stations 114a may communicate with one or more of the WTRUs 102a, 102b, 102c, or 102g over an air interface 115/116/117, which may be any suitable wireless communication link (e.g., radio frequency (RF), microwave, infrared (IR), ultraviolet (UV), visible light, cmWave, mmWave, etc.). The air interface 115/116/117 may be established using any suitable radio access technology (RAT).

The base stations 114b may communicate with one or more of the RRHs 118a, 118b, TRPs 119a, 119b, or RSUs 120a, 120b, over a wired or air interface 115b/116b/117b, which may be any suitable wired (e.g., cable, optical fiber, etc.) or wireless communication link (e.g., radio frequency (RF), microwave, infrared (IR), ultraviolet (UV), visible light, cmWave, mmWave, etc.). The air interface 115b/116b/117b may be established using any suitable radio access technology (RAT).

The RRHs 118a, 118b, TRPs 119a, 119b or RSUs 120a, 120b, may communicate with one or more of the WTRUs 102c, 102d, 102e, 102f over an air interface 115c/116c/117c, which may be any suitable wireless communication link (e.g., radio frequency (RF), microwave, infrared (IR), ultra-violet (UV), visible light, cmWave, mmWave, etc.). The air interface 115c/116c/117c may be established using any suitable radio access technology (RAT).

The WTRUs 102a, 102b, 102c, 102d, 102e, or 102f may communicate with one another over an air interface 115d/116d/117d, such as Sidelink communication, which may be any suitable wireless communication link (e.g., radio frequency (RF), microwave, infrared (IR), ultraviolet (UV), visible light, cmWave, mmWave, etc.). The air interface 115d/116d/117d may be established using any suitable radio access technology (RAT).

The communications system 100 may be a multiple access system and may employ one or more channel access schemes, such as CDMA, TDMA, FDMA, OFDMA, SC-FDMA, and the like. For example, the base station 114a in the RAN 103/104/105 and the WTRUs 102a, 102b, 102c, or RRHs 118a, 118b, TRPs 119a, 119b and RSUs 120a, 120b, in the RAN 103b/104b/105b and the WTRUs 102c, 102d, 102e, 102f, may implement a radio technology such as Universal Mobile Telecommunications System (UMTS) Terrestrial Radio Access (UTRA), which may establish the air interface 115/116/117 or 115c/116c/117c respectively using wideband CDMA (WCDMA). WCDMA may include communication protocols such as High-Speed Packet Access (HSPA) or Evolved HSPA (HSPA+). HSPA may include High-Speed Downlink Packet Access (HSDPA) or High-Speed Uplink Packet Access (HSUPA).

In an example, the base station 114a and the WTRUs 102a, 102b, 102c, or RRHs 118a, 118b, TRPs 119a, 119b, or RSUs 120a, 120b in the RAN 103b/104b/105b and the WTRUs 102c, 102d, may implement a radio technology such as Evolved UMTS Terrestrial Radio Access (E-UTRA), which may establish the air interface 115/116/117 or 115c/116c/117c respectively using Long Term Evolution (LTE) or LTE-Advanced (LTE-A). In the future, the air interface 115/116/117 or 115c/116c/117c may implement 3GPP NR technology. The LTE and LTE-A technology may include LTE D2D and V2X technologies and interfaces (such as Sidelink communications, etc.). Similarly, the 3GPP NR technology includes NR V2X technologies and interface (such as Sidelink communications, etc.).

The base station 114a in the RAN 103/104/105 and the WTRUs 102a, 102b, 102c, and 102g or RRHs 118a, 118b, TRPs 119a, 119b or RSUs 120a, 120b in the RAN 103b/104b/105b and the WTRUs 102c, 102d, 102e, 102f may implement radio technologies such as IEEE 802.16 (e.g., Worldwide Interoperability for Microwave Access (WiMAX)), CDMA2000, CDMA2000 1×, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114c in FIG. 8A may be a wireless router, Home Node B, Home eNode B, or access point, for example, and may utilize any suitable RAT for facilitating wireless connectivity in a localized area, such as a place of business, a home, a vehicle, a train, an aerial, a satellite, a manufactory, a campus, and the like, for implementing the methods, systems, and devices of 5G support for AI/ML communications, as disclosed herein. In an example, the base station 114c and the WTRUs 102, e.g., WTRU 102e, may implement a radio technology such as IEEE 802.11 to establish a wireless local area network (WLAN). similarly, the base station 114c and the WTRUs 102d, may implement a radio technology such as IEEE 802.15 to establish a wireless personal area network (WPAN). In yet another example, the base station 114c and the WTRUs 102, e.g., WTRU 102e, may utilize a cellular-based RAT (e.g., WCDMA, CDMA2000, GSM, LTE, LTE-A, NR, etc.) to establish a picocell or femtocell. As shown in FIG. 8A, the base station 114c may have a direct connection to the Internet 110. Thus, the base station 114c may not be required to access the Internet 110 via the core network 106/107/109.

The RAN 103/104/105 or RAN 103b/104b/105b may be in communication with the core network 106/107/109, which may be any type of network configured to provide voice, data, messaging, authorization and authentication, applications, or voice over internet protocol (VoIP) services to one or more of the WTRUs 102a, 102b, 102c, 102d. For example, the core network 106/107/109 may provide call control, billing services, mobile location-based services, pre-paid calling, Internet connectivity, packet data network connectivity, Ethernet connectivity, video distribution, etc., or perform high-level security functions, such as user authentication.

Although not shown in FIG. 8A, it will be appreciated that the RAN 103/104/105 or RAN 103b/104b/105b or the core network 106/107/109 may be in direct or indirect communication with other RANs that employ the same RAT as the RAN 103/104/105 or RAN 103b/104b/105b or a different RAT. For example, in addition to being connected to the RAN 103/104/105 or RAN 103b/104b/105b, which may be utilizing an E-UTRA radio technology, the core network 106/107/109 may also be in communication with another RAN (not shown) employing a GSM or NR radio technology.

The core network 106/107/109 may also serve as a gateway for the WTRUs 102a, 102b, 102c, 102d, 102e to access the PSTN 108, the Internet 110, or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned or operated by other service providers. For example, the networks 112 may include any type of packet data network (e.g., an IEEE 802.3 Ethernet network) or another core network connected to one or more RANs, which may employ the same RAT as the RAN 103/104/105 or RAN 103b/104b/105b or a different RAT.

Some or all of the WTRUs 102a, 102b, 102c, 102d, 102e, and 102f in the communications system 100 may include multi-mode capabilities, e.g., the WTRUs 102a, 102b, 102c, 102d, 102e, and 102f may include multiple transceivers for communicating with different wireless networks over different wireless links for implementing methods, systems, and devices of 5G support for AI/ML communications, as disclosed herein. For example, the WTRU 102g shown in FIG. 8A may be configured to communicate with the base station 114a, which may employ a cellular-based radio technology, and with the base station 114c, which may employ an IEEE 802 radio technology.

Although not shown in FIG. 8A, it will be appreciated that a User Equipment may make a wired connection to a gateway. The gateway maybe a Residential Gateway (RG). The RG may provide connectivity to a Core Network 106/107/109. It will be appreciated that much of the subject matter included herein may equally apply to UEs that are WTRUs and UEs that use a wired connection to connect with a network. For example, the subject matter that applies to the wireless interfaces 115, 116, 117 and 115c/116c/117c may equally apply to a wired connection.

Figure 8B:
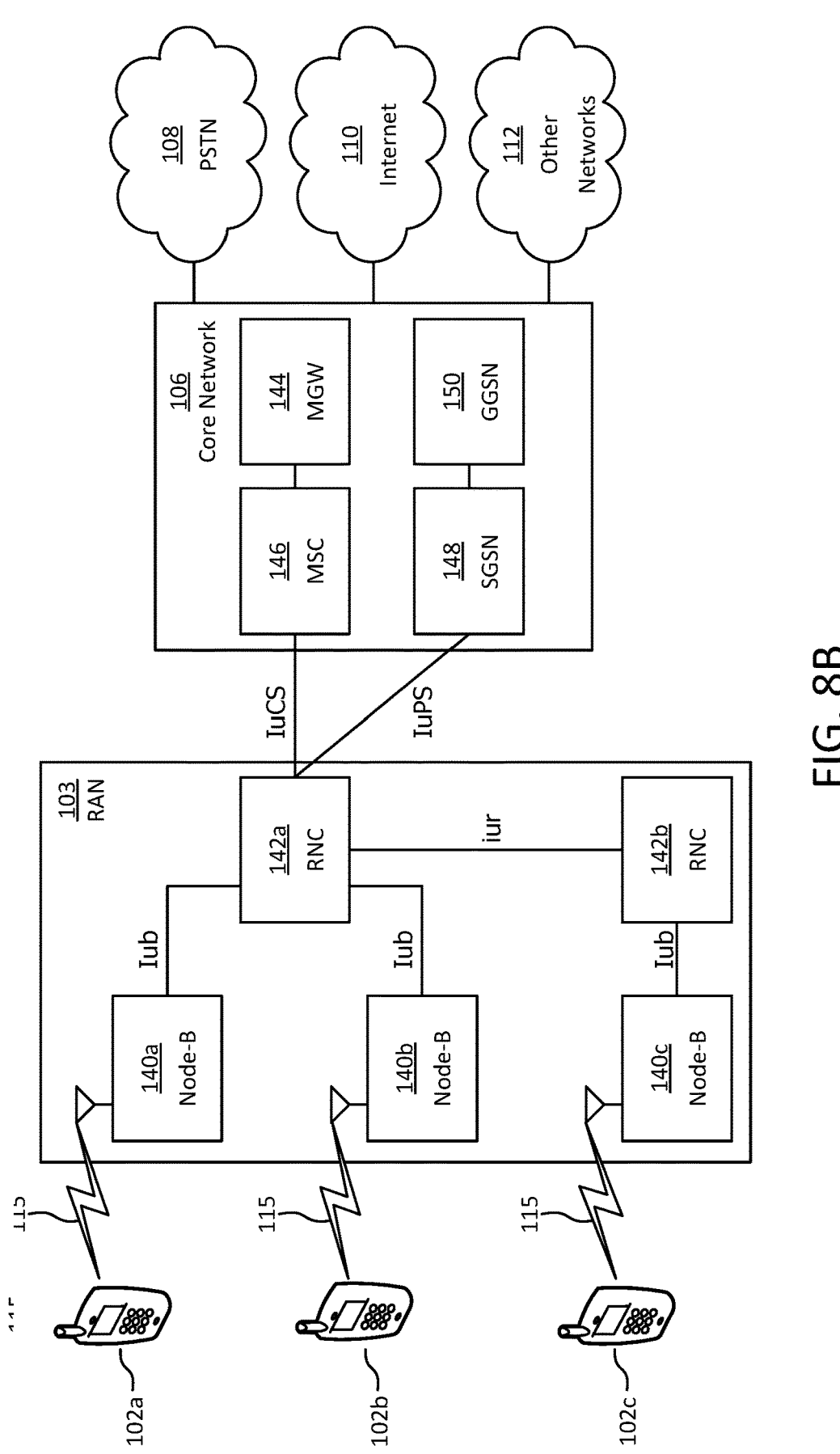
FIG. 8B illustrates an exemplary system that includes RANs and core networks.

FIG. 8B is a system diagram of an example RAN 103 and core network 106 that may implement methods, systems, and devices of 5G support for AI/ML communications, as disclosed herein. As noted above, the RAN 103 may employ a UTRA radio technology to communicate with the WTRUs 102a, 102b, and 102c over the air interface 115. The RAN 103 may also be in communication with the core network 106. As shown in FIG. 8B, the RAN 103 may include Node-Bs 140a, 140b, and 140c, which may each include one or more transceivers for communicating with the WTRUs 102a, 102b, and 102c over the air interface 115. The Node-Bs 140a, 140b, and 140c may each be associated with a particular cell (not shown) within the RAN 103. The RAN 103 may also include RNCs 142a, 142b. It will be appreciated that the RAN 103 may include any number of Node-Bs and Radio Network Controllers (RNCs.)

As shown in FIG. 8B, the Node-Bs 140a, 140b may be in communication with the RNC 142a. Additionally, the Node-B 140c may be in communication with the RNC 142b. The Node-Bs 140a, 140b, and 140c may communicate with the respective RNCs 142a and 142b via an Iub interface. The RNCs 142a and 142b may be in communication with one another via an Iur interface. Each of the RNCs 142a and 142b may be configured to control the respective Node-Bs 140a, 140b, and 140c to which it is connected. In addition, each of the RNCs 142a and 142b may be configured to carry out or support other functionality, such as outer loop power control, load control, admission control, packet scheduling, handover control, macro-diversity, security functions, data encryption, and the like.

The core network 106 shown in FIG. 8B may include a media gateway (MGW) 144, a Mobile Switching Center (MSC) 146, a Serving GPRS Support Node (SGSN) 148, or a Gateway GPRS Support Node (GGSN) 150. While each of the foregoing elements are depicted as part of the core network 106, it will be appreciated that any one of these elements may be owned or operated by an entity other than the core network operator.

The RNC 142a in the RAN 103 may be connected to the MSC 146 in the core network 106 via an IuCS interface. The MSC 146 may be connected to the MGW 144. The MSC 146 and the MGW 144 may provide the WTRUs 102a, 102b, and 102c with access to circuit-switched networks, such as the PSTN 108, to facilitate communications between the WTRUs 102a, 102b, and 102c, and traditional land-line communications devices.

The RNC 142a in the RAN 103 may also be connected to the SGSN 148 in the core network 106 via an IuPS interface. The SGSN 148 may be connected to the GGSN 150. The SGSN 148 and the GGSN 150 may provide the WTRUs 102a, 102b, and 102c with access to packet-switched networks, such as the Internet 110, to facilitate communications between and the WTRUs 102a, 102b, and 102c, and IP-enabled devices.

The core network 106 may also be connected to the other networks 112, which may include other wired or wireless networks that are owned or operated by other service providers.

Figure 8C:
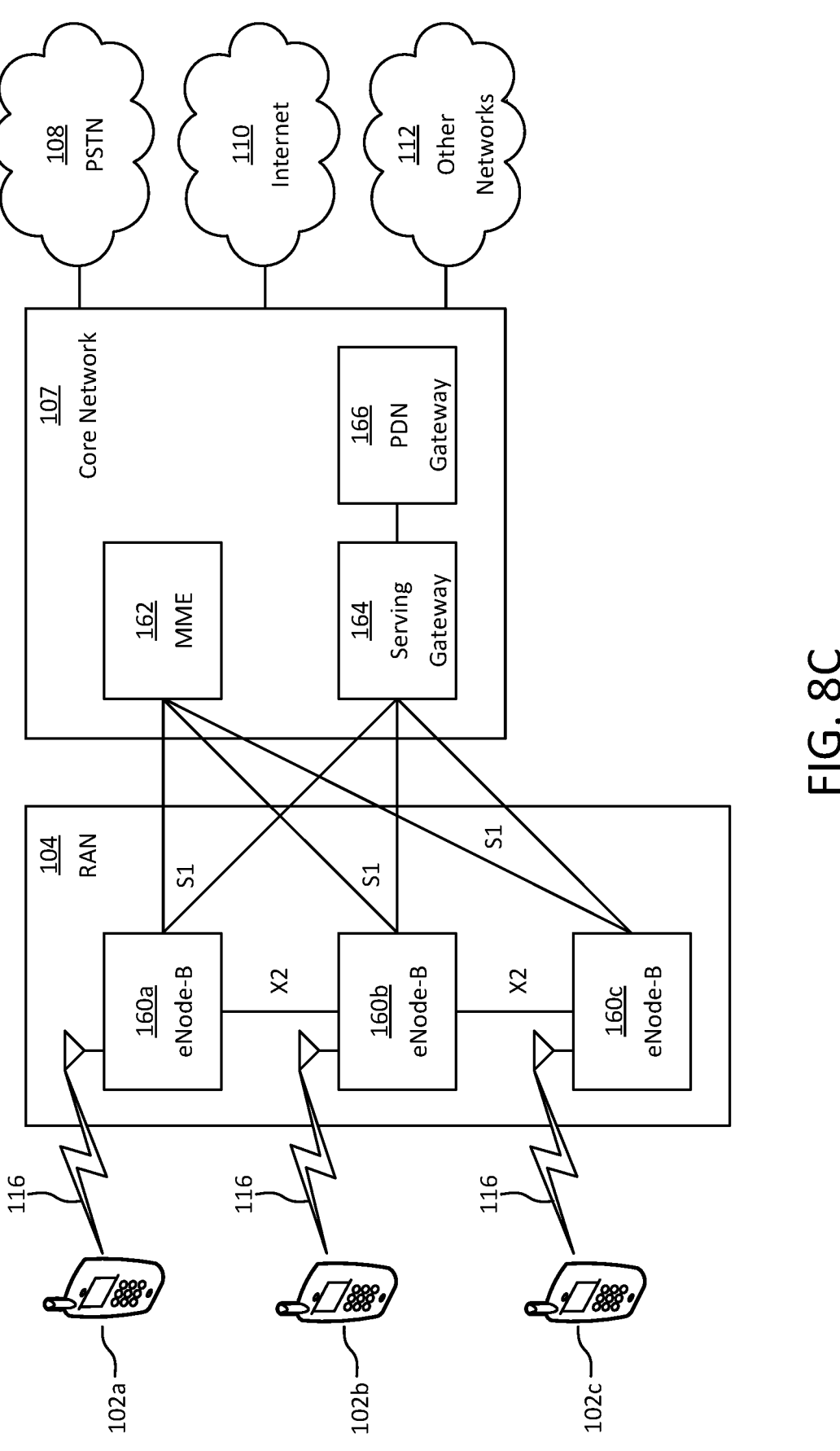
FIG. 8C illustrates an exemplary system that includes RANs and core networks.

FIG. 8C is a system diagram of an example RAN 104 and core network 107 that may implement methods, systems, and devices of 5G support for AI/ML communications, as disclosed herein. As noted above, the RAN 104 may employ an E-UTRA radio technology to communicate with the WTRUs 102a, 102b, and 102c over the air interface 116. The RAN 104 may also be in communication with the core network 107.

The RAN 104 may include eNode-Bs 160a, 160b, and 160c, though it will be appreciated that the RAN 104 may include any number of eNode-Bs. The eNode-Bs 160a, 160b, and 160c may each include one or more transceivers for communicating with the WTRUs 102a, 102b, and 102c over the air interface 116. For example, the eNode-Bs 160a, 160b, and 160c may implement MIMO technology. Thus, the eNode-B 160a, for example, may use multiple antennas to transmit wireless signals to, and receive wireless signals from, the WTRU 102a.

Each of the eNode-Bs 160a, 160b, and 160c may be associated with a particular cell (not shown) and may be configured to handle radio resource management decisions, handover decisions, scheduling of users in the uplink or downlink, and the like. As shown in FIG. 8C, the eNode-Bs 160a, 160b, and 160c may communicate with one another over an X2 interface.

The core network 107 shown in FIG. 8C may include a Mobility Management Gateway (MME) 162, a serving gateway 164, and a Packet Data Network (PDN) gateway 166. While each of the foregoing elements are depicted as part of the core network 107, it will be appreciated that any one of these elements may be owned or operated by an entity other than the core network operator.

The MME 162 may be connected to each of the eNode-Bs 160a, 160b, and 160c in the RAN 104 via an S1 interface and may serve as a control node. For example, the MME 162 may be responsible for authenticating users of the WTRUs 102a, 102b, and 102c, bearer activation/deactivation, selecting a particular serving gateway during an initial attach of the WTRUs 102a, 102b, and 102c, and the like. The MME 162 may also provide a control plane function for switching between the RAN 104 and other RANs (not shown) that employ other radio technologies, such as GSM or WCDMA.

The serving gateway 164 may be connected to each of the eNode-Bs 160a, 160b, and 160c in the RAN 104 via the S1 interface. The serving gateway 164 may generally route and forward user data packets to/from the WTRUs 102a, 102b, and 102c. The serving gateway 164 may also perform other functions, such as anchoring user planes during inter-eNode B handovers, triggering paging when downlink data is available for the WTRUs 102a, 102b, and 102c, managing and storing contexts of the WTRUs 102a, 102b, and 102c, and the like.

The serving gateway 164 may also be connected to the PDN gateway 166, which may provide the WTRUs 102a, 102b, and 102c with access to packet-switched networks, such as the Internet 110, to facilitate communications between the WTRUs 102a, 102b, 102c, and IP-enabled devices.

The core network 107 may facilitate communications with other networks. For example, the core network 107 may provide the WTRUs 102a, 102b, and 102c with access to circuit-switched networks, such as the PSTN 108, to facilitate communications between the WTRUs 102a, 102b, and 102c and traditional land-line communications devices. For example, the core network 107 may include, or may communicate with, an IP gateway (e.g., an IP Multimedia Subsystem (IMS) server) that serves as an interface between the core network 107 and the PSTN 108. In addition, the core network 107 may provide the WTRUs 102a, 102b, and 102c with access to the networks 112, which may include other wired or wireless networks that are owned or operated by other service providers.

Figure 8D:
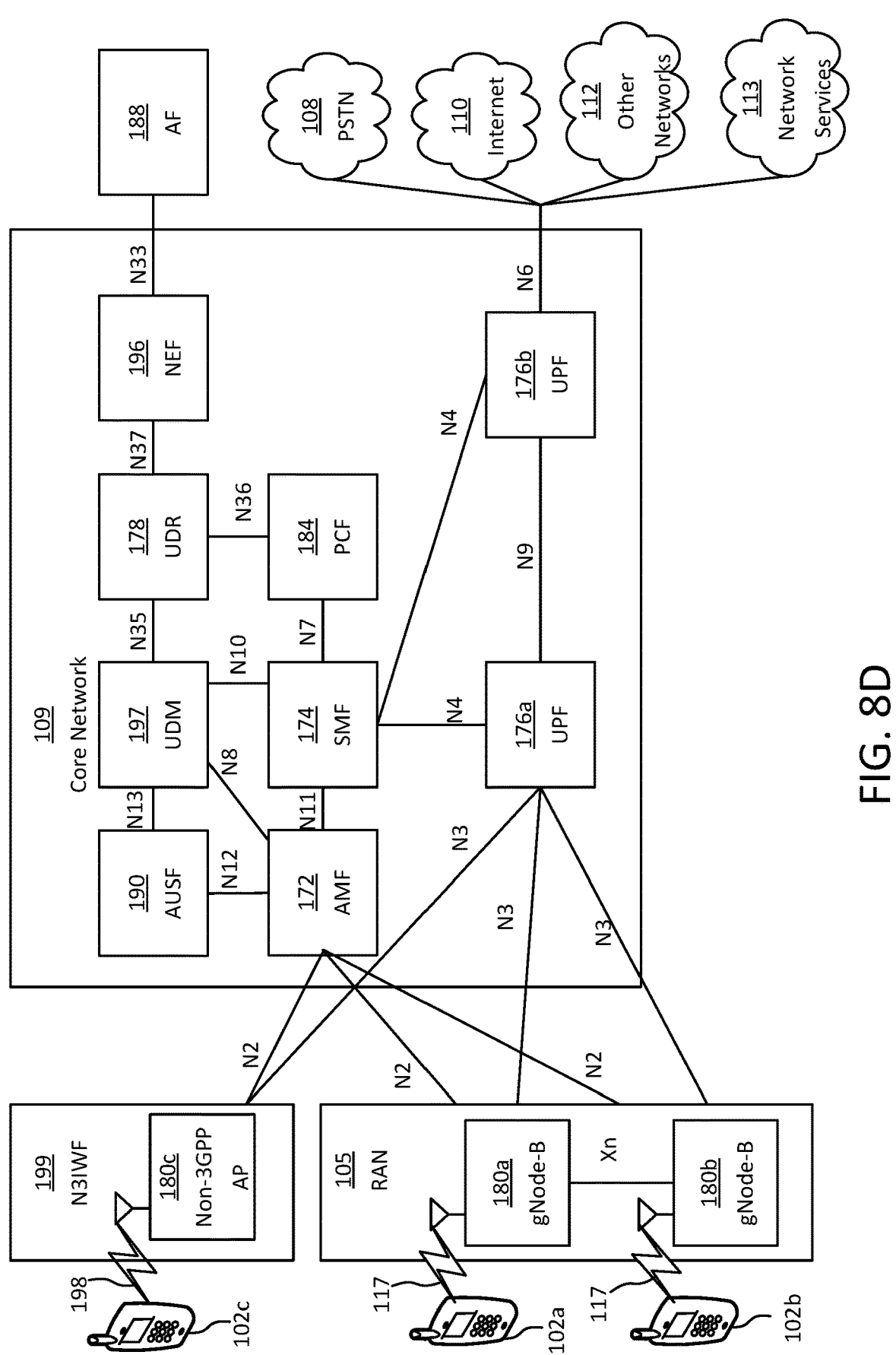
FIG. 8D illustrates an exemplary system that includes RANs and core networks.

FIG. 8D is a system diagram of an example RAN 105 and core network 109 that may implement methods, systems, and devices of 5G support for AI/ML communications, as disclosed herein. The RAN 105 may employ an NR radio technology to communicate with the WTRUs 102a and 102b over the air interface 117. The RAN 105 may also be in communication with the core network 109. A Non-3GPP Interworking Function (N3IWF) 199 may employ a non-3GPP radio technology to communicate with the WTRU 102c over the air interface 198. The N3IWF 199 may also be in communication with the core network 109.

The RAN 105 may include gNode-Bs 180a and 180b. It will be appreciated that the RAN 105 may include any number of gNode-Bs. The gNode-Bs 180a and 180b may each include one or more transceivers for communicating with the WTRUs 102a and 102b over the air interface 117. When integrated access and backhaul connection are used, the same air interface may be used between the WTRUs and gNode-Bs, which may be the core network 109 via one or multiple gNBs. The gNode-Bs 180a and 180b may implement MIMO, MU-MIMO, or digital beamforming technology. Thus, the gNode-B 180a, for example, may use multiple antennas to transmit wireless signals to, and receive wireless signals from, the WTRU 102a. It should be appreciated that the RAN 105 may employ of other types of base stations such as an eNode-B. It will also be appreciated the RAN 105 may employ more than one type of base station. For example, the RAN may employ eNode-Bs and gNode-Bs.

The N3IWF 199 may include a non-3GPP Access Point 180c. It will be appreciated that the N3IWF 199 may include any number of non-3GPP Access Points. The non-3GPP Access Point 180c may include one or more transceivers for communicating with the WTRUs 102c over the air interface 198. The non-3GPP Access Point 180c may use the 802.11 protocol to communicate with the WTRU 102c over the air interface 198.

Each of the gNode-Bs 180a and 180b may be associated with a particular cell (not shown) and may be configured to handle radio resource management decisions, handover decisions, scheduling of users in the uplink or downlink, and the like. As shown in FIG. 8D, the gNode-Bs 180a and 180b may communicate with one another over an Xn interface, for example.

The core network 109 shown in FIG. 8D may be a 5G core network (5GC). The core network 109 may offer numerous communication services to customers who are interconnected by the radio access network. The core network 109 comprises a number of entities that perform the functionality of the core network. As used herein, the term "core network entity" or "network function" refers to any entity that performs one or more functionalities of a core network. It is understood that such core network entities may be logical entities that are implemented in the form of computer-executable instructions (software) stored in a memory of, and executing on a processor of, an apparatus configured for wireless or network communications or a computer system, such as system 90 illustrated in FIG. 8G.

In the example of FIG. 8D, the 5G Core Network 109 may include an access and mobility management function (AMF) 172, a Session Management Function (SMF) 174, User Plane Functions (UPFs) 176a and 176b, a User Data Management Function (UDM) 197, an Authentication Server Function (AUSF) 190, a Network Exposure Function (NEF) 196, a Policy Control Function (PCF) 184, a Non-3GPP Interworking Function (N3IWF) 199, a User Data Repository (UDR) 178. While each of the foregoing elements are depicted as part of the 5G core network 109, it will be appreciated that any one of these elements may be owned or operated by an entity other than the core network operator. It will also be appreciated that a 5G core network may not consist of all of these elements, may consist of additional elements, and may consist of multiple instances of each of these elements. FIG. 8D shows that network functions directly connect with one another, however, it should be appreciated that they may communicate via routing agents such as a diameter routing agent or message buses.

In the example of FIG. 8D, connectivity between network functions is achieved via a set of interfaces, or reference points. It will be appreciated that network functions could be modeled, described, or implemented as a set of services that are invoked, or called, by other network functions or services. Invocation of a Network Function service may be achieved via a direct connection between network functions, an exchange of messaging on a message bus, calling a software function, etc.

The AMF 172 may be connected to the RAN 105 via an N2 interface and may serve as a control node. For example, the AMF 172 may be responsible for registration management, connection management, reachability management, access authentication, access authorization. The AMF may be responsible forwarding user plane tunnel configuration information to the RAN 105 via the N2 interface. The AMF 172 may receive the user plane tunnel configuration information from the SMF via an N11 interface. The AMF 172 may generally route and forward NAS packets to/from the WTRUs 102a, 102b, and 102c via an N1 interface. The N1 interface is not shown in FIG. 8D.

The SMF 174 may be connected to the AMF 172 via an N11 interface. Similarly the SMF may be connected to the PCF 184 via an N7 interface, and to the UPFs 176a and 176b via an N4 interface. The SMF 174 may serve as a control node. For example, the SMF 174 may be responsible for Session Management, IP address allocation for the WTRUs 102a, 102b, and 102c, management and configuration of traffic steering rules in the UPF 176a and UPF 176b, and generation of downlink data notifications to the AMF 172.

The UPF 176a and UPF176b may provide the WTRUs 102a, 102b, and 102c with access to a Packet Data Network (PDN), such as the Internet 110, to facilitate communications between the WTRUs 102a, 102b, and 102c and other devices. The UPF 176a and UPF 176b may also provide the WTRUs 102a, 102b, and 102c with access to other types of packet data networks. For example, Other Networks 112 may be Ethernet Networks or any type of network that exchanges packets of data. The UPF 176a and UPF 176b may receive traffic steering rules from the SMF 174 via the N4 interface. The UPF 176a and UPF 176b may provide access to a packet data network by connecting a packet data network with an N6 interface or by connecting to each other and to other UPFs via an N9 interface. In addition to providing access to packet data networks, the UPF 176 may be responsible packet routing and forwarding, policy rule enforcement, quality of service handling for user plane traffic, downlink packet buffering.

The AMF 172 may also be connected to the N3IWF 199, for example, via an N2 interface. The N3IWF facilitates a connection between the WTRU 102c and the 5G core network 170, for example, via radio interface technologies that are not defined by 3GPP. The AMF may interact with the N3IWF 199 in the same, or similar, manner that it interacts with the RAN 105.

The PCF 184 may be connected to the SMF 174 via an N7 interface, connected to the AMF 172 via an N15 interface, and to an Application Function (AF) 188 via an N5 interface. The N15 and N5 interfaces are not shown in FIG. 8D. The PCF 184 may provide policy rules to control plane nodes such as the AMF 172 and SMF 174, allowing the control plane nodes to enforce these rules. The PCF 184, may send policies to the AMF 172 for the WTRUs 102a, 102b, and 102c so that the AMF may deliver the policies to the WTRUs 102a, 102b, and 102c via an N1 interface. Policies may then be enforced, or applied, at the WTRUs 102a, 102b, and 102c.

The UDR 178 may act as a repository for authentication credentials and subscription information. The UDR may connect with network functions, so that network function can add to, read from, and modify the data that is in the repository. For example, the UDR 178 may connect with the PCF 184 via an N36 interface. Similarly, the UDR 178 may connect with the NEF 196 via an N37 interface, and the UDR 178 may connect with the UDM 197 via an N35 interface.

The UDM 197 may serve as an interface between the UDR 178 and other network functions. The UDM 197 may authorize network functions to access of the UDR 178. For example, the UDM 197 may connect with the AMF 172 via an N8 interface, the UDM 197 may connect with the SMF 174 via an N10 interface. Similarly, the UDM 197 may connect with the AUSF 190 via an N13 interface. The UDR 178 and UDM 197 may be tightly integrated.

The AUSF 190 performs authentication related operations and connect with the UDM 178 via an N13 interface and to the AMF 172 via an N12 interface.

The NEF 196 exposes capabilities and services in the 5G core network 109 to Application Functions (AF) 188. Exposure may occur on the N33 API interface. The NEF may connect with an AF 188 via an N33 interface and it may connect with other network functions in order to expose the capabilities and services of the 5G core network 109.

Application Functions 188 may interact with network functions in the 5G Core Network 109. Interaction between the Application Functions 188 and network functions may be via a direct interface or may occur via the NEF 196. The Application Functions 188 may be considered part of the 5G Core Network 109 or may be external to the 5G Core Network 109 and deployed by enterprises that have a business relationship with the mobile network operator.

Network Slicing is a mechanism that could be used by mobile network operators to support one or more 'virtual' core networks behind the operator's air interface. This involves 'slicing' the core network into one or more virtual networks to support different RANs or different service types running across a single RAN. Network slicing enables the operator to create networks customized to provide optimized solutions for different market scenarios which demands diverse requirements, e.g. in the areas of functionality, performance and isolation.

3GPP has designed the 5G core network to support Network Slicing. Network Slicing is a good tool that network operators can use to support the diverse set of 5G use cases (e.g., massive IoT, critical communications, V2X, and enhanced mobile broadband) which demand very diverse and sometimes extreme requirements. Without the use of network slicing techniques, it is likely that the network architecture would not be flexible and scalable enough to efficiently support a wider range of use cases need when each use case has its own specific set of performance, scalability, and availability requirements. Furthermore, introduction of new network services should be made more efficient.

Referring again to FIG. 8D, in a network slicing scenario, a WTRU 102a, 102b, or 102c may connect with an AMF 172, via an N1 interface. The AMF may be logically part of one or more slices. The AMF may coordinate the connection or communication of WTRU 102a, 102b, or 102c with one or more UPF 176a and 176b, SMF 174, and other network functions. Each of the UPFs 176a and 176b, SMF 174, and other network functions may be part of the same slice or different slices. When they are part of different slices, they may be isolated from each other in the sense that they may utilize different computing resources, security credentials, etc.

The core network 109 may facilitate communications with other networks. For example, the core network 109 may include, or may communicate with, an IP gateway, such as an IP Multimedia Subsystem (IMS) server, that serves as an interface between the 5G core network 109 and a PSTN 108. For example, the core network 109 may include, or communicate with a short message service (SMS) service center that facilities communication via the short message service. For example, the 5G core network 109 may facilitate the exchange of non-IP data packets between the WTRUs 102a, 102b, and 102c and servers or applications functions 188. In addition, the core network 170 may provide the WTRUs 102a, 102b, and 102c with access to the networks 112, which may include other wired or wireless networks that are owned or operated by other service providers.

The core network entities described herein and illustrated in FIG. 8A, FIG. 8C, FIG. 8D, or FIG. 8E are identified by the names given to those entities in certain existing 3GPP specifications, but it is understood that in the future those entities and functionalities may be identified by other names and certain entities or functions may be combined in future specifications published by 3GPP, including future 3GPP NR specifications. Thus, the particular network entities and functionalities described and illustrated in FIG. 8A, FIG. 8B, FIG. 8C, FIG. 8D, or FIG. 8E are provided by way of example only, and it is understood that the subject matter disclosed and claimed herein may be embodied or implemented in any similar communication system, whether presently defined or defined in the future.

Figure 8E:
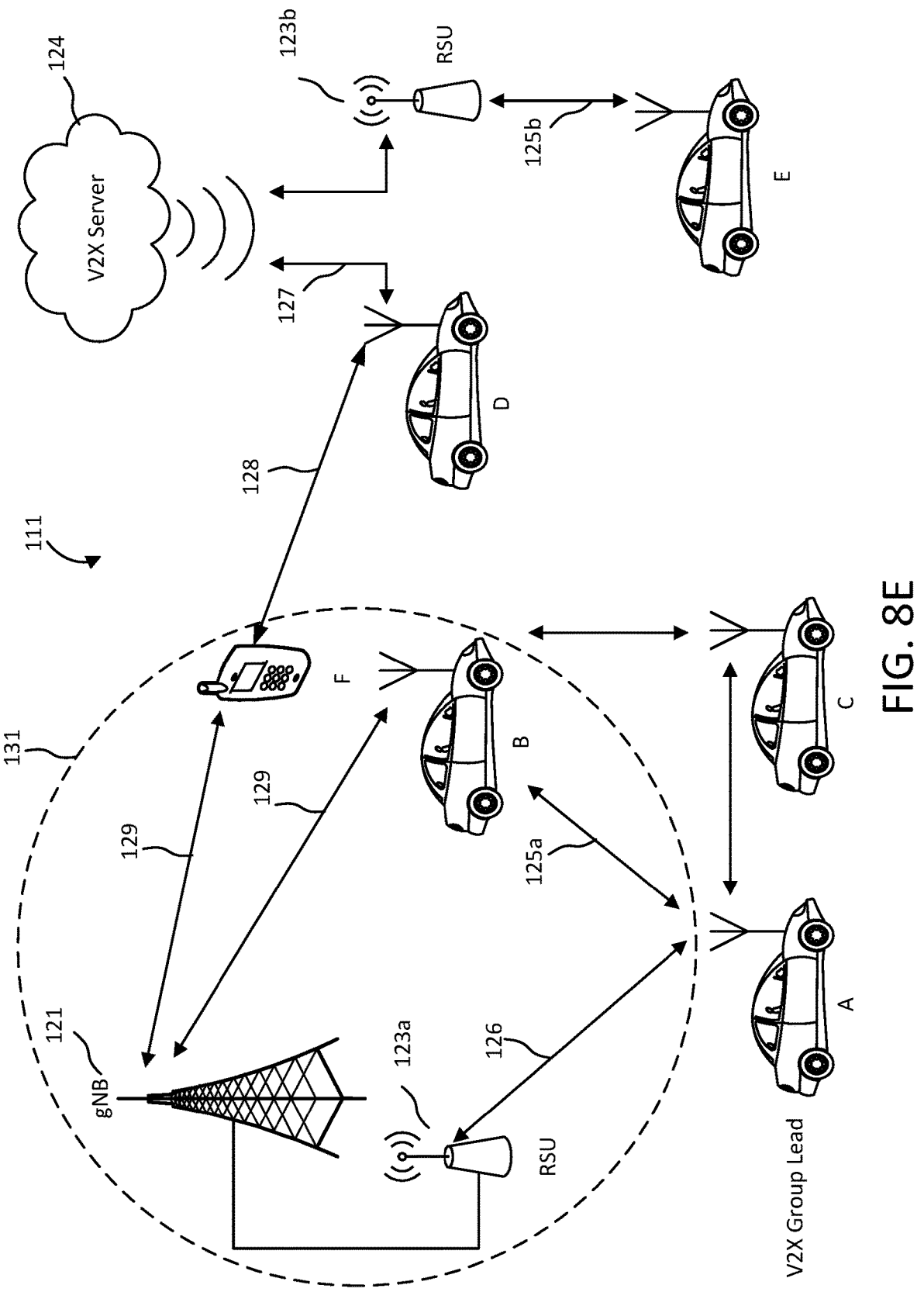
FIG. 8E illustrates another example communications system.

FIG. 8E illustrates an example communications system 111 in which the systems, methods, apparatuses that implement 5G support for AI/ML communications, described herein, may be used. Communications system 111 may include Wireless Transmit/Receive Units (WTRUs) A, B, C, D, E, F, a base station gNB 121, a V2X server 124, and Road Side Units (RSUs) 123a and 123b. In practice, the concepts presented herein may be applied to any number of WTRUs, base station gNBs, V2X networks, or other network elements. One or several or all WTRUs A, B, C, D, E, and F may be out of range of the access network coverage 131. WTRUs A, B, and C form a V2X group, among which WTRU A is the group lead and WTRUs B and C are group members.

WTRUs A, B, C, D, E, and F may communicate with each other over a Uu interface 129 via the gNB 121 if they are within the access network coverage 131. In the example of FIG. 8E, WTRUs B and F are shown within access network coverage 131. WTRUs A, B, C, D, E, and F may communicate with each other directly via a Sidelink interface (e.g., PC5 or NR PC5) such as interface 125a, 125b, or 128, whether they are under the access network coverage 131 or out of the access network coverage 131. For instance, in the example of FIG. 8E, WRTU D, which is outside of the access network coverage 131, communicates with WTRU F, which is inside the coverage 131.

WTRUs A, B, C, D, E, and F may communicate with RSU 123a or 123b via a Vehicle-to-Network (V2N) 133 or Sidelink interface 125b. WTRUs A, B, C, D, E, and F may communicate to a V2X Server 124 via a Vehicle-to-Infrastructure (V2I) interface 127. WTRUs A, B, C, D, E, and F may communicate to another UE via a Vehicle-to-Person (V2P) interface 128.

Figure 8F:
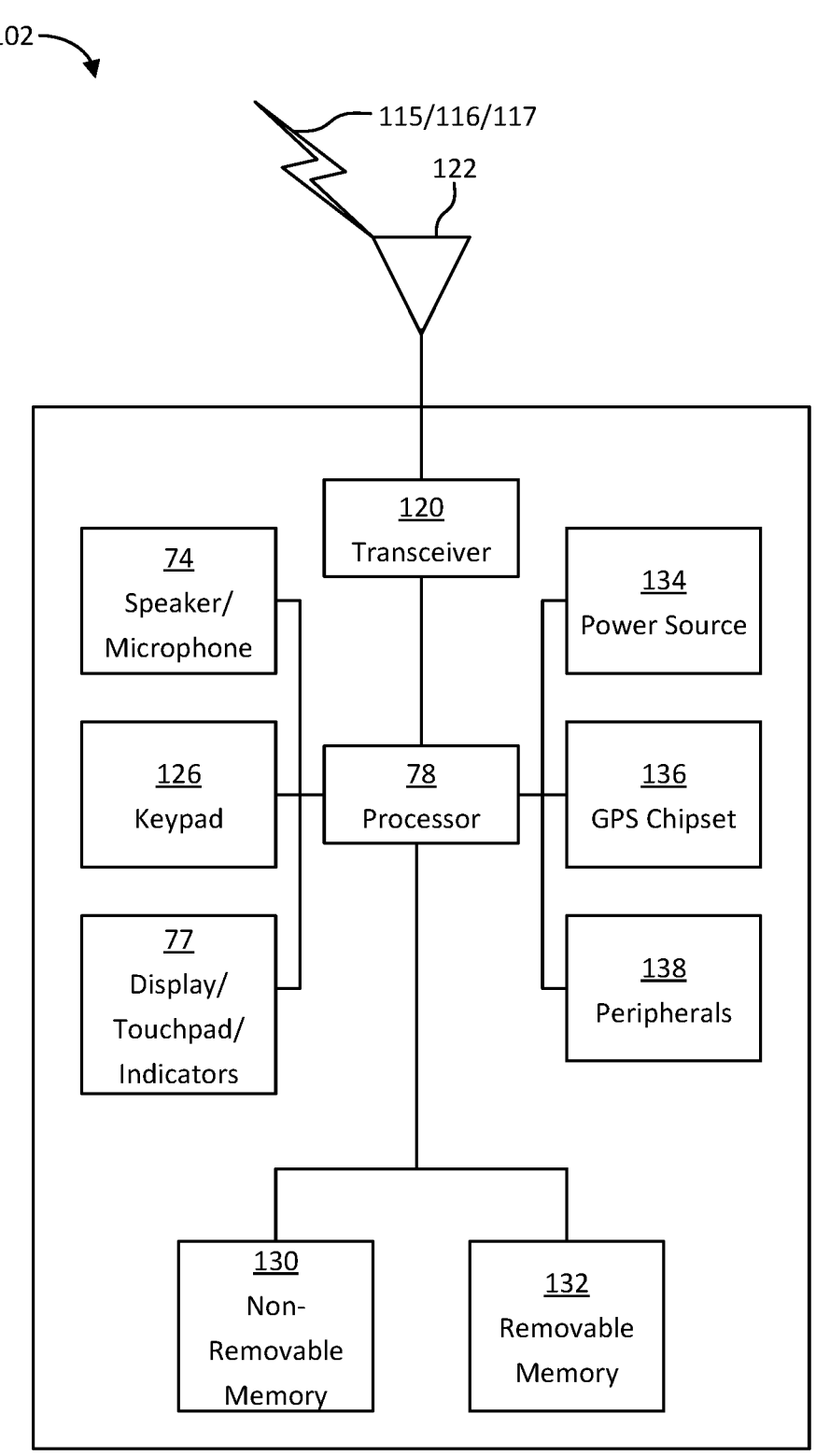
FIG. 8F is a block diagram of an example apparatus or device, such as a WTRU.

FIG. 8F is a block diagram of an example apparatus or device WTRU 102 that may be configured for wireless communications and operations in accordance with the systems, methods, and apparatuses that implement 5G support for AI/ML communications, described herein, such as a WTRU 102 of FIG. 8A, FIG. 8B, FIG. 8C, FIG. 8D, or FIG. 8E, or FIG. 2-FIG. 6. As shown in FIG. 8F, the example WTRU 102 may include a processor 78, a transceiver 120, a transmit/receive element 122, a speaker/microphone 74, a keypad 126, a display/touchpad/indicators 77, non-removable memory 130, removable memory 132, a power source 134, a global positioning system (GPS) chipset 136, and other peripherals 138. It will be appreciated that the WTRU 102 may include any sub-combination of the foregoing elements. Also, the base stations 114a and 114b, or the nodes that base stations 114a and 114b may represent, such as but not limited to transceiver station (BTS), a Node-B, a site controller, an access point (AP), a home node-B, an evolved home node-B (eNodeB), a home evolved node-B (HeNB), a home evolved node-B gateway, a next generation node-B (gNode-B), and proxy nodes, among others, may include some or all of the elements depicted in FIG. 8F and may be an exemplary implementation that performs the disclosed systems and methods for 5G support for AI/ML communications described herein.

The processor 78 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 78 may perform signal coding, data processing, power control, input/output processing, or any other functionality that enables the WTRU 102 to operate in a wireless environment. The processor 78 may be coupled to the transceiver 120, which may be coupled to the transmit/receive element 122. While FIG. 8F depicts the processor 78 and the transceiver 120 as separate components, it will be appreciated that the processor 78 and the transceiver 120 may be integrated together in an electronic package or chip.

The transmit/receive element 122 of a UE may be configured to transmit signals to, or receive signals from, a base station (e.g., the base station 114a of FIG. 8A) over the air interface 115/116/117 or another UE over the air interface 115d/116d/117d. For example, the transmit/receive element 122 may be an antenna configured to transmit or receive RF signals. The transmit/receive element 122 may be an emitter/detector configured to transmit or receive IR, UV, Radar, LIDAR, or visible light signals, for example. The transmit/receive element 122 may be configured to transmit and receive both RF and light signals. It will be appreciated that the transmit/receive element 122 may be configured to transmit or receive any combination of wireless or wired signals.

In addition, although the transmit/receive element 122 is depicted in FIG. 8F as a single element, the WTRU 102 may include any number of transmit/receive elements 122. More specifically, the WTRU 102 may employ MIMO technology. Thus, the WTRU 102 may include two or more transmit/receive elements 122 (e.g., multiple antennas) for transmitting and receiving wireless signals over the air interface 115/116/117.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, for example NR and IEEE 802.11 or NR and E-UTRA, or to communicate with the same RAT via multiple beams to different RRHs, TRPs, RSUs, or nodes.

The processor 78 of the WTRU 102 may be coupled to, and may receive user input data from, the speaker/microphone 74, the keypad 126, or the display/touchpad/indicators 77 (e.g., a liquid crystal display (LCD) display unit or organic light-emitting diode (OLED) display unit. The processor 78 may also output user data to the speaker/microphone 74, the keypad 126, or the display/touchpad/indicators 77. In addition, the processor 78 may access information from, and store data in, any type of suitable memory, such as the non-removable memory 130 or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. The processor 78 may access information from, and store data in, memory that is not physically located on the WTRU 102, such as on a server that is hosted in the cloud or in an edge computing platform or in a home computer (not shown). The processor 78 may be configured to control lighting patterns, images, or colors on the display or indicators 77 in response to whether the setup of the 5G support for AI/ML communications in some of the examples described herein are successful or unsuccessful, or otherwise indicate a status of 5G support for AI/ML communications and associated components. The control lighting patterns, images, or colors on the display or indicators 77 may be reflective of the status of any of the method flows or components in the FIG.'s illustrated or discussed herein (e.g., FIG. 2-FIG. 6, etc.). Disclosed herein are messages and procedures of 5G (or other wireless systems) support for AI/ML communications. The messages and procedures may be extended to provide interface/API for users to request resources via an input source (e.g., speaker/microphone 74, keypad 126, or display/touchpad/ indicators 77) and request, configure, or query 5G support for AI/ML communications related information, among other things that may be displayed on display 77.

The processor 78 may receive power from the power source 134 and may be configured to distribute or control the power to the other components in the WTRU 102. The power source 134 may be any suitable device for powering the WTRU 102. For example, the power source 134 may include one or more dry cell batteries, solar cells, fuel cells, and the like.

The processor 78 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 115/116/ 117 from a base station (e.g., base stations 114a, 114b) or determine its location based on the timing of the signals being received from two or more nearby base stations. It will be appreciated that the WTRU 102 may acquire location information by way of any suitable location-determination method.

The processor 78 may further be coupled to other peripherals 138, which may include one or more software or hardware modules that provide additional features, functionality, or wired or wireless connectivity. For example, the peripherals 138 may include various sensors such as an accelerometer, biometrics (e.g., finger print) sensors, an e-compass, a satellite transceiver, a digital camera (for photographs or video), a universal serial bus (USB) port or other interconnect interfaces, a vibration device, a television transceiver, a hands free headset, a Bluetooth® module, a frequency modulated (FM) radio unit, a digital music player, a media player, a video game player module, an Internet browser, and the like.

The WTRU 102 may be included in other apparatuses or devices, such as a sensor, consumer electronics, a wearable device such as a smart watch or smart clothing, a medical or eHealth device, a robot, industrial equipment, a drone, a vehicle such as a car, truck, train, or an airplane. The WTRU 102 may connect with other components, modules, or systems of such apparatuses or devices via one or more interconnect interfaces, such as an interconnect interface that may comprise one of the peripherals 138.

Figure 8G:
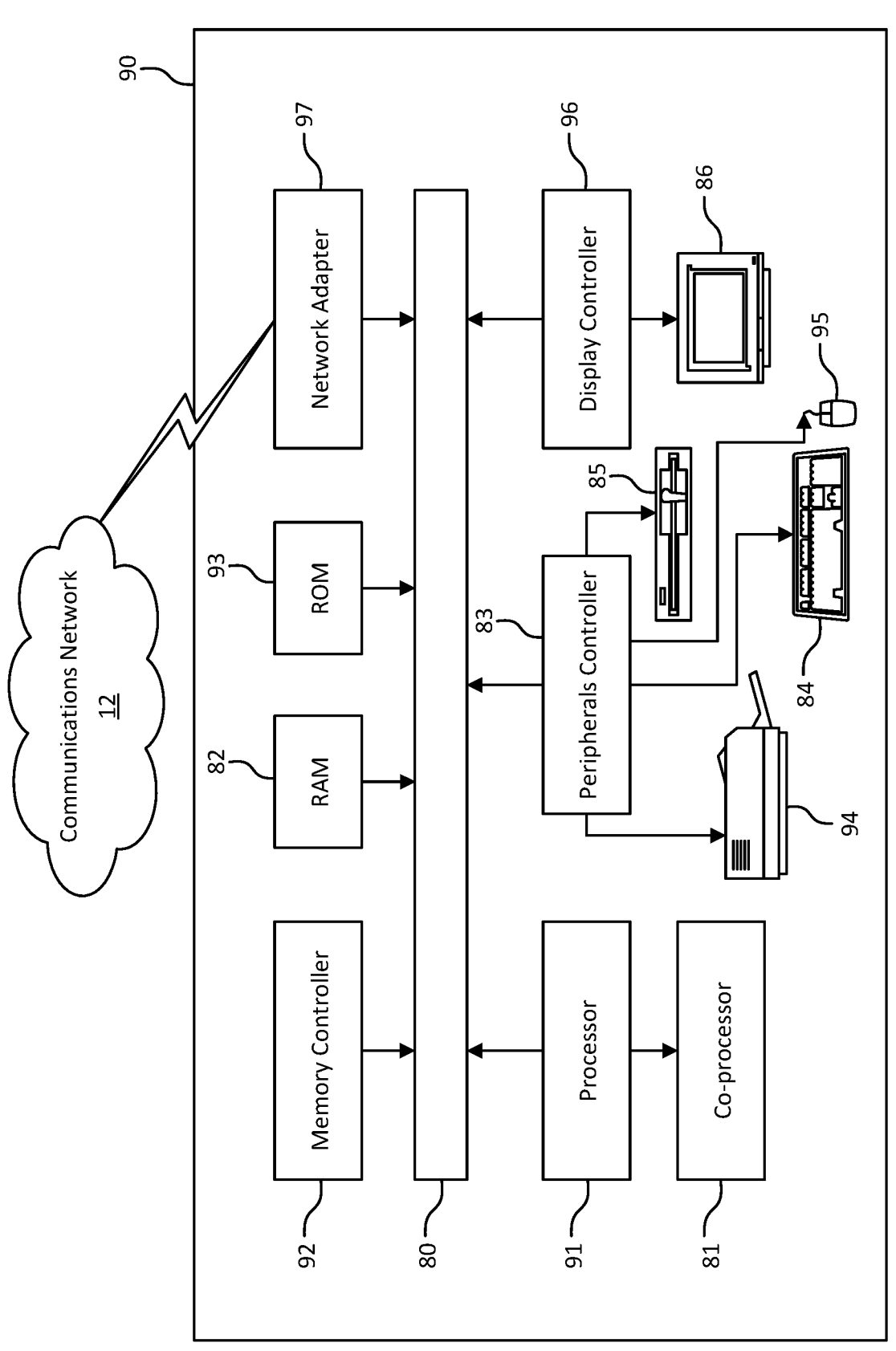
FIG. 8G is a block diagram of an exemplary computing system.

FIG. 8G is a block diagram of an exemplary computing system 90 in which one or more apparatuses of the communications networks illustrated in FIG. 8A, FIG. 8C, FIG. 8D and FIG. 8E as well as 5G support for AI/ML communications, such as the systems and methods illustrated in FIG. 2 through FIG. 6 described and claimed herein may be embodied, such as certain nodes or functional entities in the RAN 103/104/105, Core Network 106/107/109, PSTN 108, Internet 110, Other Networks 112, or Network Services 113. Computing system 90 may comprise a computer or server and may be controlled primarily by computer readable instructions, which may be in the form of software, wherever, or by whatever means such software is stored or accessed. Such computer readable instructions may be executed within a processor 91, to cause computing system 90 to do work. The processor 91 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 91 may perform signal coding, data processing, power control, input/output processing, or any other functionality that enables the computing system 90 to operate in a communications network. Coprocessor 81 is an optional processor, distinct from main processor 91, that may perform additional functions or assist processor 91. Processor 91 or coprocessor 81 may receive, generate, and process data related to the methods and apparatuses disclosed herein for 5G support for AI/ML communications, such as receiving messages.

In operation, processor 91 fetches, decodes, and executes instructions, and transfers information to and from other resources via the computing system's main data-transfer path, system bus 80. Such a system bus connects the components in computing system 90 and defines the medium for data exchange. System bus 80 typically includes data lines for sending data, address lines for sending addresses, and control lines for sending interrupts and for operating the system bus. An example of such a system bus 80 is the PCI (Peripheral Component Interconnect) bus.

Memories coupled to system bus 80 include random access memory (RAM) 82 and read only memory (ROM) 93. Such memories include circuitry that allows information to be stored and retrieved. ROMs 93 generally include stored data that cannot easily be modified. Data stored in RAM 82 may be read or changed by processor 91 or other hardware devices. Access to RAM 82 or ROM 93 may be controlled by memory controller 92. Memory controller 92 may provide an address translation function that translates virtual addresses into physical addresses as instructions are executed. Memory controller 92 may also provide a memory protection function that isolates processes within the system and isolates system processes from user processes. Thus, a program running in a first mode may access only memory mapped by its own process virtual address space; it cannot access memory within another process's virtual address space unless memory sharing between the processes has been set up.

In addition, computing system 90 may include peripherals controller 83 responsible for communicating instructions from processor 91 to peripherals, such as printer 94, keyboard 84, mouse 95, and disk drive 85.

Display 86, which is controlled by display controller 96, is used to display visual output generated by computing system 90. Such visual output may include text, graphics, animated graphics, and video. The visual output may be provided in the form of a graphical user interface (GUI). Display 86 may be implemented with a CRT-based video display, an LCD-based flat-panel display, gas plasma-based flat-panel display, or a touch-panel. Display controller 96 includes electronic components required to generate a video signal that is sent to display 86.

Further, computing system 90 may include communication circuitry, such as for example a wireless or wired network adapter 97, that may be used to connect computing system 90 to an external communications network or devices, such as the RAN 103/104/105, Core Network 106/107/109, PSTN 108, Internet 110, WTRUs 102, or Other Networks 112 of FIG. 8A, FIG. 8B, FIG. 8C, FIG. 8D, or FIG. 8E, to enable the computing system 90 to communicate with other nodes or functional entities of those networks. The communication circuitry, alone or in combination with the processor 91, may be used to perform the transmitting and receiving steps of certain apparatuses, nodes, or functional entities described herein.

It is understood that any or all of the apparatuses, systems, methods and processes described herein may be embodied in the form of computer executable instructions (e.g., program code) stored on a computer-readable storage medium which instructions, when executed by a processor, such as processors 78 or 91, cause the processor to perform or implement the systems, methods and processes described herein. Specifically, any of the steps, operations, or functions described herein may be implemented in the form of such computer executable instructions, executing on the processor of an apparatus or computing system configured for wireless or wired network communications. Computer readable storage media includes volatile and nonvolatile, removable and non-removable media implemented in any non-transitory (e.g., tangible or physical) method or technology for storage of information, but such computer readable storage media do not include signals. Computer readable storage media include, but are not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other tangible or physical medium which may be used to store the desired information and which may be accessed by a computing system.

In describing preferred methods, systems, or apparatuses of the subject matter of the present disclosure—5G support for AI/ML communications—as illustrated in the Figures, specific terminology is employed for the sake of clarity. The claimed subject matter, however, is not intended to be limited to the specific terminology so selected.

The various techniques described herein may be implemented in connection with hardware, firmware, software or, where appropriate, combinations thereof. Such hardware, firmware, and software may reside in apparatuses located at various nodes of a communication network. The apparatuses may operate singly or in combination with each other to effectuate the methods described herein. As used herein, the terms "apparatus," "network apparatus," "node," "device," "network node," or the like may be used interchangeably. In addition, the use of the word "or" is generally used inclusively unless otherwise provided herein. Sentences with "etc." without the "or" are assumed to include "or."

This written description uses examples for the disclosed subject matter, including the best mode, and also to enable any person skilled in the art to practice the disclosed subject matter, including making and using any devices or systems and performing any incorporated methods. The disclosed subject matter may include other examples that occur to those skilled in the art (e.g., skipping steps, combining steps, or adding steps between exemplary methods disclosed herein).

Methods, systems, and apparatuses, among other things, as described herein may provide for 5G or other system support AI/ML communications. A method, system, computer readable storage medium, or apparatus may provide for initiating verification of the analytics generated by the NWDA; performing an Nnwdaf_Analytics Subscription_Subscribe service operation on one or more Analytics IDs; provisioning an AI/ML policy to the UE to report information that the AF has subscribed to from the NWDAF; and subscribing to receive notifications from the UE for when the AI/ML data are available. A method, system, computer readable storage medium, or apparatus may provide for receiving a notification message that provides prediction outputs for the subscribed Analytics IDs; and comparing the prediction outputs from the NWDAF with the verification data provided by the UE and determines an error value between the prediction and the actual metric. A method, system, computer readable storage medium, or apparatus may provide for sending a request for a protocol data unit (PDU) session, wherein the request includes an indication that the PDU session is for use in an AI or ML communication; in response to the request, receiving a PDU session accept message from the management function, wherein the PDU session accept message includes AI or ML policy information; and communicating, based on the AI or ML policy information, AI or ML data traffic over the PDU session. The AI or ML policy may indicate the type of traffic that may be carried in the PDU session. All combinations in this paragraph and the below paragraphs (including the removal or addition of steps) are contemplated in a manner that is consistent with the other portions of the detailed description.

Methods, systems, and apparatuses, among other things, as described herein may provide for 5G or other system support AI/ML communications. A method, system, computer readable storage medium, or apparatus may provide for sending a request for a protocol data unit (PDU) session, wherein the request may include an indication that the PDU session is for transmitting or receiving AI or ML traffic; in response to the request, receiving a PDU session accept message from a management function, wherein the PDU session accept message may include information associated with an AI or ML policy; and communicating, based on the information associated with the AI or ML policy, AI or ML traffic over the PDU session, wherein the information associated with the AI or ML policy may include information indicative of a traffic type, such as model training results, training data, or other traffic associated with AI or ML that may be carried in the PDU session. The AI or ML policy may include an application ID that the AI or ML policy applies to. The information associated with the AI or ML policy may include information indicative of model information. The model information may include model type. The model type may include linear regression, decision tree, support vector machine, naïve bayes, k-nearest neighbors, k-means, random forest, dimensionality reduction, or gradient boosting. The information associated with the AI or ML policy may indicate learning information that is used to determine the type of AI or ML traffic (e.g., data) the AI or ML policy applies to. The information associated with the AI or ML policy may include reporting information associated with AI or ML. The reporting information may include a time window or frequency for sending the reporting information. The reporting information may include destination address for a report.

A method, system, computer readable storage medium, or apparatus may include UE requests a PDU Session for use in AI/ML communications; SMF returns a PDU session establishment accept message to the UE if the PDU session is able to support AI/ML traffic, An AI/ML policy may be provided to the UE as well, the AI/ML policy may have been provisioned by an AF through the UDM, PCF, SMF, or other NF for use after the PDU session has been established. The information in the AI/ML policy may be used by the UE to transfer AL/ML traffic over the PDU Session and allows the system to differentiate AI/ML traffic from other traffic for charging purposes.

A method, system, computer readable storage medium, or apparatus may provide for artificial intelligence (AI) or machine learning (ML) traffic reporting information from an application server, wherein the AI/ML reporting information comprises a time window or frequency for sending a report and a destination address for the report; receiving a request for a protocol data unit (PDU) session, wherein the request comprises an indication that the PDU session is for transmitting or receiving AI or ML traffic; and in response to the request, sending a PDU session accept message from a management function, wherein the PDU session accept message comprises information associated with an AI or ML policy and reporting information, wherein the information associated with the AI or ML policy indicates a traffic type. The device implementing the subject matter may be a network node or WTRU.

A method, system, computer readable storage medium, or apparatus may provide for sending a request for a protocol data unit (PDU) session, wherein the request includes an indication that the PDU session is for use in an AI or ML communication; in response to the request, receiving a PDU session accept message from the management function, wherein the PDU session accept message includes AI or ML policy information; and communicating (e.g., sending or receiving), based on the AI or ML policy information, AI or ML data traffic over the PDU session. The AI or ML policy information may include information associated with model training results, training data, labeled data, inference data, or data for analytics verification. All combinations in this paragraph and the above paragraphs (including the removal or addition of steps) are contemplated in a manner that is consistent with the other portions of the detailed description.

What is claimed is:

1. A wireless transmit/receive unit (WTRU) comprising at least one processor configured to:
   establish a protocol data unit (PDU) session for an artificial intelligence (AI) or machine learning (ML) communication;

report, using the PDU session, device capability and performance measurement information to an application function (AF) on a network entity;
receiving, from the AF on the network entity, a request to participate in one or more federated learning (FL) processes in response to the device capability and performance measurement information; and
report AI/ML data to the AF according to an AI/ML policy, wherein the AI/ML policy includes reporting information that specifies at least one of a type of AI/ML data to be reported or a frequency to report the AI/ML data.

2. The WTRU of claim 1, wherein the device capability and performance measurement information is reported in response to a triggering rule at the WTRU.

3. The WTRU of claim 2, wherein the triggering rule indicates a triggering of the device capability and performance measurement information upon the WTRU entering a defined area or a cell within the network, and wherein the triggering rule comprises one or more conditions, and wherein the device capability and performance measurement information is reported based on a determination that at least one condition of the one or more conditions is satisfied.

4. The WTRU of claim 1, wherein the device capability comprises at least one of a processor name at the WTRU, a processor type at the WTRU, a number of processing cores at the WTRU, a presence and capability of AI/ML cores at the WTRU, operating frequencies of the processing cores at the WTRU, a total installed memory at the WTRU, a total flash memory at the WTRU, a battery size at the WTRU, a radio capability at the WTRU, or available sensors at the WTRU.

5. The WTRU of claim 1, wherein the AI/ML policy further comprises at least one of an AI/ML type for performing the federated learning processes at the WTRU, an AI/ML purpose for performing the federated learning processes at the WTRU, model information indicating one or more model parameters for performing the federated learning processes at the WTRU, or performance information to be met when performing the federated learning processes at the WTRU.

6. The WTRU of claim 1, wherein the one or more FL processes comprises a process configured to implement a local model to perform one or more AI/ML operations at each WTRU of a plurality of WTRUs in accordance with the AI/ML policy, wherein the plurality of WTRUs comprise the WTRU.

7. The WTRU of claim 6, wherein the one or more AI/ML operations comprise collecting, processing, or reporting the AI/ML data locally at each WTRU of the plurality of WTRUs, and wherein the AI/ML policy indicates at least one of the AI/ML data to collect, how the AI/ML data is to be processed, how often to collect the AI/ML data, an AI/ML operational mode to apply to the model, or how often to report results to the AS for each WTRU of the plurality of WTRUs.

8. The WTRU of claim 1, wherein the AI/ML data comprises at least one of a raw or processed data for inference, raw or processed labeled data for training, intermediate results of model training, measurement or performance information, or other data involved with AI/ML operations.

9. The WTRU of claim 1, wherein the AI/ML policy comprises performance information that indicates to the WTRU what performance measurements are to be exposed to the AS, wherein the performance measurement information comprises a signal power, an experienced data rate, a number of retransmissions, an experienced latency, a battery level, a discharge rate, a central processing unit (CPU) utilization of the WTRU, a memory utilization of the WTRU, or a percentage loading for AI/ML relative to a total load of the WTRU.

10. The WTRU of claim 1, wherein the frequency comprises how often to report the AI/ML data, or wherein the frequency comprises a number of iterations the WTRU performs AI/ML operation or reports the AI/ML data after each iteration.

11. A network entity operating an application function (AF), the network entity comprising at least one processor configured to:

obtain information from a network that indicates network conditions in a designated area of the network, wherein the information comprises at least one of a number of WTRUs located in the designated area or a number of PDU sessions that have been established for AI/ML communications;

receive, from each WTRU of a plurality of WTRUs in the designated area of the network, device capability and performance measurement information;

transmit, to at least a subset of the plurality of WTRUs, an indication of selection for participation in one or more federated learning (FL) processes in response to the device capability and performance measurement information; and receive AI/ML data from each WTRU of the subset of the plurality of WTRUs selected for participation in the one or more federated learning processes, wherein the AI/ML data is received according to an AI/ML policy that includes reporting information that specifies at least one of a type of AI/ML data to be reported or a frequency to report the AI/ML data.

12. The network entity of claim 11, wherein the device capability and performance measurement information is reported in response to a triggering rule at the WTRU.

13. The network entity of claim 12, wherein the triggering rule indicates a triggering of the device capability and performance measurement information upon the WTRU entering a defined area or a cell within the network, and wherein the trigggering rule comprises one or more conditions, and wherein the device capability and performance measurement information is reported based on a determination that at least one condition of the one or more conditions is satisfied.

14. The network entity of claim 11, wherein the device capability comprises at least one of a processor name at the WTRU, a processor type at the WTRU, a number of processing cores at the WTRU, a presence and capability of AI/ML cores at the WTRU, operating frequencies of the processing cores at the WTRU, a total installed memory at the WTRU, a total flash memory at the WTRU, a battery size at the WTRU, a radio capability at the WTRU, or available sensors at the WTRU.

15. The network entity of claim 11, wherein the AI/ML policy further comprises at least one of an AI/ML type for performing the federated learning processes at each WTRU of the subset of the plurality of WTRUs, an AI/ML purpose for performing the federated learning processes at each WTRU of the subset of the plurality of WTRUs, model information indicating one or more model parameters for performing the federated learning processes at each WTRU of the subset of the plurality of WTRUs, or performance information to be met when performing the federated learning processes at each WTRU of the subset of the plurality of WTRUs.

16. The network entity of claim 11, wherein the network entity being configured to transmit the indication of the selection comprises the network entity being configured to implement a local model to perform one or more AI/ML operations in accordance with the AI/ML policy, wherein the one or more AI/ML operations comprise collecting, processing, or reporting the AI/ML data, and wherein the AI/ML policy comprises what data to collect, how the collected data is to be processed, how often to collect the data, what AI/ML operational mode to apply to the model, or how often to report results to the AS.

17. The network entity of claim 16, wherein the one or more AI/ML operations comprise collecting, processing, or reporting the AI/ML data locally at each WTRU of the plurality of WTRUs, and wherein the AI/ML policy indicates at least one of the AI/ML data to collect, how the AI/ML data is to be processed, how often to collect the AI/ML data, an AI/ML operational mode to apply to the model, or how often to report results to the AS for each WTRU of the plurality of WTRUs.

18. The network entity of claim 11, wherein the AI/ML data comprises at least one of a raw or processed data for inference, raw or processed labeled data for training, intermediate results of model training, measurement or performance information, or other data involved with AI/ML operations.

19. The network entity of claim 11, wherein the AI/ML policy comprises performance information that indicates to the WTRU what performance measurements are to be exposed to the AS, wherein the performance measurement information comprises a signal power, an experienced data rate, a number of retransmissions, an experienced latency, a battery level, a discharge rate, a central processing unit (CPU) utilization of the WTRU, a memory utilization of the WTRU, or a percentage loading for AI/ML relative to a total load of the WTRU.

20. The network entity of claim 11, wherein the frequency comprises how often to report the AI/ML data, or wherein the frequency comprises a number of iterations the WTRU performs AI/ML operation or reports the AI/ML data after each iteration.

* * * * *